US006463116B1

(12) United States Patent
Oikawa

(10) Patent No.: US 6,463,116 B1
(45) Date of Patent: Oct. 8, 2002

(54) RADIOGRAPHIC APPARATUS

(75) Inventor: Shiro Oikawa, Shiga-ken (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 10/046,085

(22) Filed: Jan. 16, 2002

(30) Foreign Application Priority Data

Mar. 13, 2001 (JP) ...................................... 2001-070718

(51) Int. Cl.⁷ ................................................ A61B 6/03
(52) U.S. Cl. .......................................... 378/4; 378/901
(58) Field of Search .................... 378/4, 8, 15, 901

(56) References Cited

U.S. PATENT DOCUMENTS 5,838,756 A * 11/1998 Taguchi et al. ................. 378/4

* cited by examiner

Primary Examiner—David V. Bruce
(74) Attorney, Agent, or Firm—Rader, Fishman & Grauer PLLC

(57) ABSTRACT

A radiation source and an area detector are arranged across sectional planes of an object are driven to scan and pick up images of the sectional planes. A back projection unit performs an the image reconstruction to generate three-dimensional volume data of a region of interest of the object by projecting projection data detected in varied scan positions back to predetermined lattice points of a three-dimensional lattice virtually set to the region of interest. The back projection unit generates the three-dimensional volume data, with lattice spacing along a sectional axis extending substantially through the center of the region of interest and perpendicular to the sectional planes, among the three orthogonal axes of the three-dimensional lattice, made larger than lattice spacing in the two other directions. This reduces the amount of data back-projected, and shortens the processing time for the image reconstruction.

20 Claims, 17 Drawing Sheets

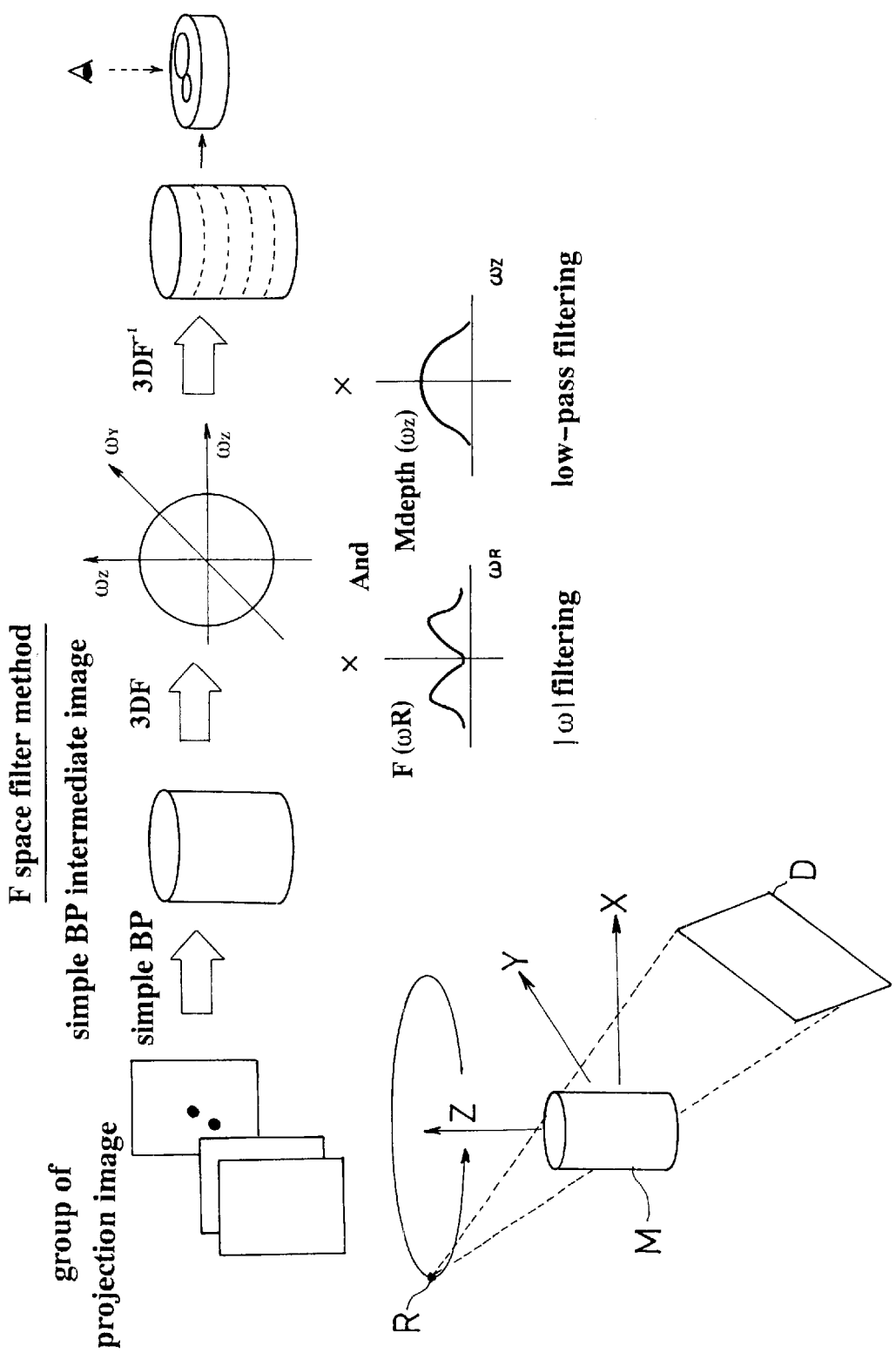

front view (seen in −Y direction)

plan view (seen in −Z direction)

RADIOGRAPHIC APPARATUS

BACKGROUND OF THE INVENTION (1) Field of the Invention

This invention relates to radiographic apparatus of the non-CT (Computed Tomography) type used in medical, industrial and other fields for producing sectional images of patients or objects under examination. More particularly, the invention relates to a technique for shortening a processing time needed for image reconstruction and reducing artifacts appearing in the sectional images.

(2) Description of the Related Art

Conventional radiographic apparatus include an X-ray radiographic apparatus, for example. The X-ray radiographic apparatus has an X-ray tube and an image intensifier opposed to each other across an object under examination. The X-ray tube is linearly moved in a first direction, and in synchronism therewith the image intensifier is moved in a second direction counter to the first direction. With this movement, the apparatus intermittently performs radiography while varying an angle of X-ray emission from the X-ray tube to the object, such that a given point in a particular sectional plane of the object always corresponds to the same location on the detecting plane of the image intensifier. Then, a process is carried out simply to add detection signals so as to overlap a plurality of projected images acquired by radiography done from varied angles. In this way, the apparatus derives image information on a particular section of the object and image information on adjacent sections at opposite sides of the particular section.

Thus, the above X-ray radiographic apparatus is based the non-CT type radiographic technique distinct from the X-ray CT type radiographic technique which has made remarkable progress in recent years. That is, the X-ray CT type radiographic technique acquires transmitted images by driving an X-ray tube and an image intensifier opposed to each other across an object under examination to make one revolution (at least a half revolution) about the body axis of the object. An image reconstruction is carried out based on transmitted images acquired from one revolution (at least a half revolution) about the body axis of the object, to produce a sectional image seen in a direction along the body axis of the object. The non-CT type radiographic technique, as does the foregoing X-ray radiographic apparatus, produces a sectional image seen in a direction along the body axis of the object, without causing the X-ray tube and image intensifier to make a half or more revolution about the body axis of the object.

Nowadays, further improvement is desired for the non-CT type radiographic technique, and in this context, a possibility of employing what is known as a back projection method is being explored. This method does not perform an image reconstruction to obtain two-dimensional slice image data by adding detection signals so as to overlap a plurality of projected images acquired by radiography done from varied angles. Instead, an image reconstruction is carried out to produce three-dimensional volume data of a region of interest by projecting a plurality of projection images obtained by radiographing the region of interest from varied angles, back to predetermined lattice points on a three-dimensional lattice virtually set to the region of interest of the radiographed object. The back projection method of the non-CT type radiographic technique can acquire three-dimensional volume data of a region of interest of an object in one radiographic operation. This provides an advantage of enabling a particular sectional image to be selected and displayed promptly after the radiographic operation.

However, the conventional technique noted above has the following drawback. The back projection method of the non-CT type radiographic technique carries out an image reconstruction to produce three-dimensional volume data of a region of interest by projecting a plurality of projection images obtained by radiographing the region of interest from varied angles, back to predetermined lattice points on a three-dimensional lattice virtually set to the region of interest of the radiographed object. The number of lattice points on the three-dimensional lattice, for example, corresponds to the tube of the number (100 to 1,000) of points equally arranged along each of the three axes. A projection image obtained from a particular angle, i.e. data detected by pixels on the detecting plane of the image intensifier, is projected back to predetermined lattice points on the three-dimensional lattice. This is done for a plurality of projection images obtained from varied angles. Thus, an enormous volume of data is back-projected, resulting in an extended processing time for the image reconstruction to generate three-dimensional volume data of the region of interest.

SUMMARY OF THE INVENTION

This invention has been made having regard to the state of the art noted above, and its object is to provide a radiographic apparatus which requires a reduced processing time for image reconstruction.

To fulfill the above object, Inventor has made intensive research and attained the following findings. The non-CT type radiographic technique is characterized in that a radiation source such as an X-ray tube and an area detector such as an image intensifier are not driven to make more than a half revolution about the body axis of an object under examination. To illustrate a radiographed region of interest of the object with a three-dimensional coordinate system, only a small amount of information is collected for the direction of an axis extending substantially through the center of the region of interest and perpendicular to a sectional plane. Resolution is thus lower in this direction than in the directions along the two remaining axes (which are within the sectional plane). Consequently, lattice spacing along the axis extending through the slice plane may be made larger than the lattice spacing along the other axes of a three-dimensional lattice virtually set to the region of interest of the object, without wasting image information for the direction of this axis. Rather, the processing time may be shortened.

Based on the above findings, this invention provides a radiographic apparatus for generating three-dimensional volume data of a region of interest of an object under examination by an image reconstruction of projection data acquired by radiographing the object from varied scan positions, and obtaining sectional images from the three-dimensional volume data, the apparatus comprising:

a radiation source for irradiating the object with penetrating electromagnetic waves;

an area detector for detecting electromagnetic waves transmitted through the object;

the radiation source and the area detector being arranged across sectional planes of the object and synchronously operable for scanning action; and a back projection unit for performing the image reconstruction to generate three-dimensional volume data of the region of interest by projecting projection data detected in the varied scan positions back to predetermined lattice points of a three-dimensional lattice virtually set to the region of interest of the object radiographed;

the back projection unit generating the three-dimensional volume data, with lattice spacing along a sectional axis extending substantially through the center of the region of interest and perpendicular to the sectional planes, among three orthogonal axes of the three-dimensional lattice, made larger than lattice spacing in the two other directions.

With the apparatus according to this invention, a three-dimensional lattice is virtually set to the region of interest of the object radiographed. The back projection unit increases the lattice spacing along a sectional axis extending substantially through the center of the region of interest and perpendicular to the sectional planes, among three orthogonal axes of the three dimensional lattice, to be larger than the lattice spacing in the two other directions. Then, the back projection unit performs an image reconstruction to generate three-dimensional volume data of the region of interest by projecting projection data detected in varied scan positions back to predetermined lattice points of the three-dimensional lattice having the enlarged lattice spacing along the sectional axis. Thus, compared with a back projection to a conventional three-dimensional lattice having an equal lattice spacing along the three axes, the data back-projected may be reduced by an amount corresponding to the enlarged lattice spacing along the sectional axis of three-dimensional lattice over the lattice spacing in the two other directions. The processing time relating to the image reconstruction may be shortened accordingly.

Preferably, the lattice spacing along the sectional axis has a length set based on a detection pixel length along the sectional axis which is a length of one pixel of the area detector projected to the sectional axis. This feature allows the length of the lattice spacing along the sectional axis to be set according to what is known as a lamino angle which is an angle between the sectional axis and a straight line extending from the radiation source to the center of the detecting plane of the area detector.

Preferably, a low-pass filtering unit is provided for applying a low-pass filter in a direction along the sectional axis of the projection data detected in the varied scan positions. This results in sectional images with reduced artifacts due to the influence of missing cones.

Preferably, the low-pass filtering unit includes a three-dimensional Fourier transform unit for performing a three-dimensional Fourier transform of the three-dimensional volume data generated by the back projection unit, a Fourier space low-pass filtering unit for applying a low-pass filter along the sectional axis of the Fourier space data after the three-dimensional Fourier transform, and a three-dimensional back Fourier transform unit for performing a three-dimensional back Fourier transform of the Fourier space data after application of the low-pass filter and putting the Fourier space data back to three-dimensional volume data. This further promotes the generation of sectional images with reduced artifacts due to the influence of missing cones.

Preferably, the low-pass filtering unit applies a low-pass filter for diffusing at least four times a detection pixel length along the sectional axis. This feature sufficiently suppresses artifacts in an F space filter method and a 2-D filtering method.

Preferably, high frequency components along the sectional axis of the Fourier space data to which the low-pass filter has been applied are cut, thereby generating a reduced number of sectional images of subsequent three-dimensional volume data undergoing the three-dimensional back Fourier transform by the three-dimensional back Fourier transform unit. The reduced volume of image information in the direction along the sectional axis correspondingly reduces the processing time for the three-dimensional back Fourier transform, and the number of sectional images in the direction along the sectional axis. This is effective where there is no need to reproduce images at small intervals along the sectional axis.

Preferably, the area detector is a flat panel detector having gate lines arranged in a direction along the sectional axis, the low-pass filtering unit performing low-pass filtering by simultaneously turning on gates on a predetermined number of pixel lines corresponding to the direction along the sectional axis. Such low-pass filtering based on the simultaneous actuation of the gates also is effective to produce sectional images with reduced artifacts due to the influence of missing cones.

Preferably, a real space low-pass filtering unit is provided for applying a low-pass filter along the sectional axis corresponding to predetermined times a detection pixel length along the sectional axis, to predetermined numbers of pixels of the area detector corresponding to the sectional axis. This feature also is effective to produce sectional images with reduced artifacts due to the influence of missing cones.

Preferably, the back projection unit is arranged project the projection data after the low-pass filtering back to the three-dimensional lattice, with the lattice spacing along the sectional axis of the three-dimensional lattice set between a detection pixel length along the sectional axis and a diffusion length along the sectional axis. The three-dimensional back Fourier transform is performed to generate the three-dimensional volume data diffused along the sectional axis by reducing the image information in the direction along the sectional axis. This reduces the processing time for the three-dimensional back Fourier transform, and the number of sectional images in the direction along the sectional axis. This is effective where there is no need to reproduce images at small intervals along the sectional axis.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 6 is a schematic view illustrating a series of processing steps performed by an image processor in the first embodiment;

DESCRIPTION OF THE PREFERRED EMBODIMENTS

Preferred embodiments of this invention will be described in detail hereinafter with reference to the drawings.

<First Embodiment>

Figure 1:
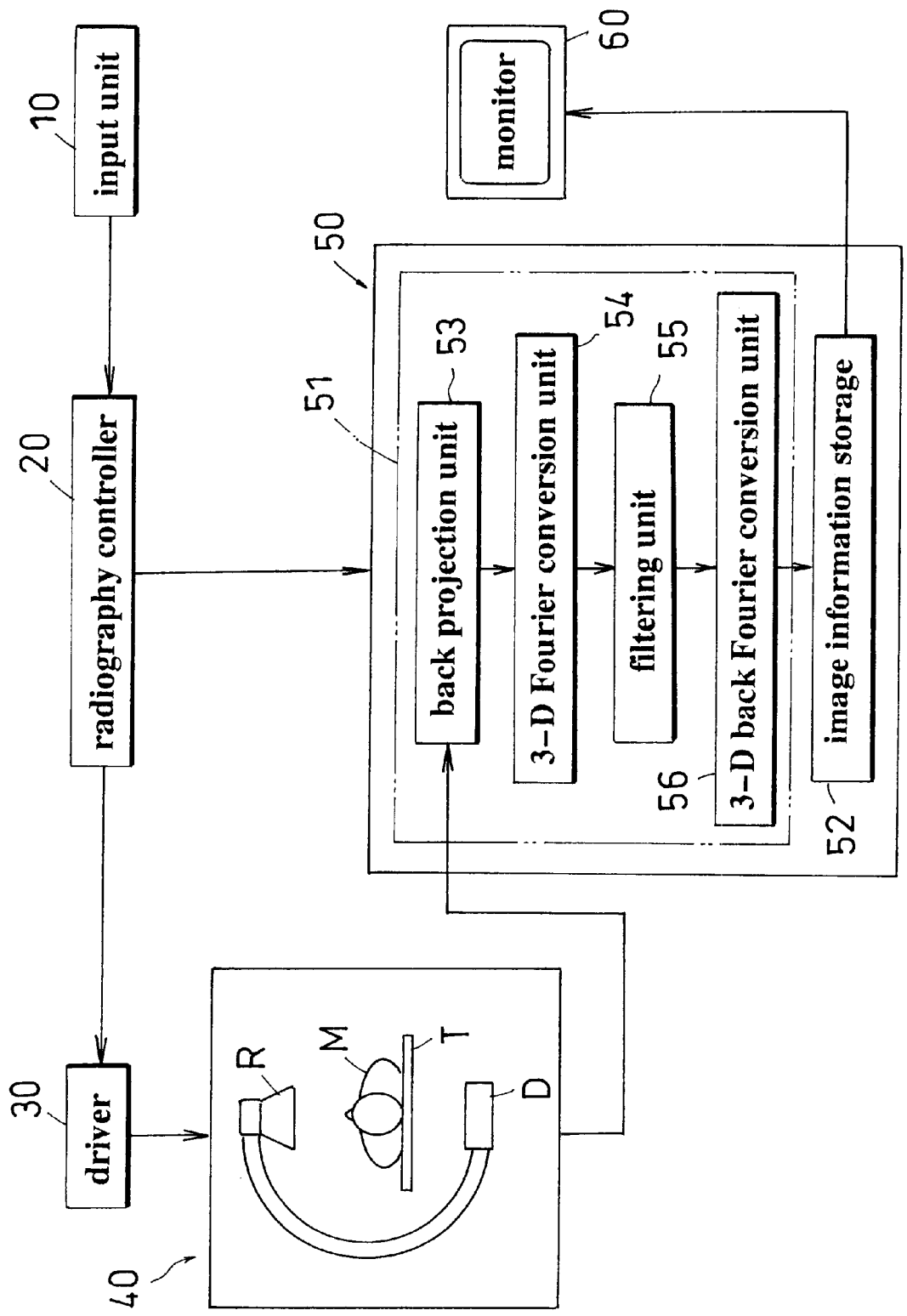
FIG. 1 is a block diagram of an X-ray radiographic apparatus in a first embodiment.

FIG. 1 is a block diagram of an X-ray radiographic apparatus in a first embodiment, which is one example of radiographic apparatus according to this invention. This X-ray radiographic apparatus includes an input unit 10 for inputting various information and instructions, a radiography controller 20 for controlling X-ray radiography based on the information and instructions inputted, a driver 30 for operating an image pickup station 40 under control of the radiography controller 20, the image pickup station 40 for picking up images of a region of interest of a patient M, a data processor 50 for performing an image reconstruction to generate three-dimensional volume data of the region of interest of patient M from image information provided by the image pickup station 40, and storing the three-dimensional volume data generated, and a monitor 60 for displaying image information stored in the data processor 50.

The construction and function of each of these components will be described hereinafter.

Figure 2:
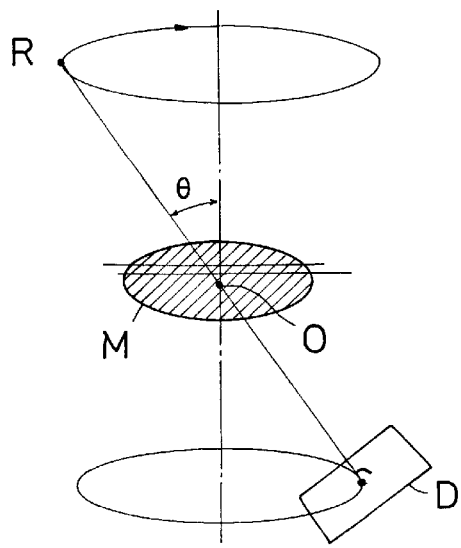
FIG. 2 is a schematic view showing an image pickup mode of the X-ray radiographic apparatus.

As shown in FIG. 2, an X-ray tube R is revolvable in one of parallel planes opposed to each other across the patient M. In synchronism with the revolution of X-ray tube R, a flat panel X-ray detector D is revolvable in the other plane in a direction counter to the direction of revolution of X-ray tube R. In this way, the region of interest of patient M is scanned and imaged. Before picking up images of the region of interest of patient M, the input unit 10 is operated to input and determine a distance from the X-ray tube R to the flat panel X-ray detector D shown in FIG. 2, a radius (e.g. 50 to 100 cm) of circles along which the X-ray tube R and flat panel X-ray detector D are to be revolved, and the number of views (e.g. 100 to 500) to be acquired, or at what pitch images are to be picked up, while the X-ray tube R and flat panel X-ray detector D are revolved. Input devices such as a keyboard, mouse and/or touch panel are used as the input unit 10. The above X-ray tube R corresponds to the radiation source in this invention.

The input unit 10 and driver 30 and data processor 50 are connected to the radiography controller 20. The radiography controller 20 controls the driver 30 and data processor 50 based on information inputted from the input unit 10. The contents of control will be described hereinafter in relation to each controlled component.

As shown in FIG. 2, the driver 30 drives the X-ray tube R to revolve in one of the parallel planes opposed to each other across the patient M, and the flat panel X-ray detector D synchronously therewith to revolve in the other plane in the direction counter to the direction of revolution of X-ray tube R. At this time, the X-ray tube R and flat panel X-ray detector D are opposed to each other, such that the center point of X rays in the form of a cone beam emitted from the X-ray tube R toward the patient M always passes through the center point o of a particular sectional plane of the patient M, and impinges on the center point of the detecting plane of flat panel X-ray detector D in a direction perpendicular thereto. Thus, the X-ray tube R and flat panel X-ray detector D are revolved along the circular tracks, with a straight line between the X-ray tube R and the center point O of the particular sectional plane of the patient M forming an angle (angle of inclination) θ with a vertical line extending to the particular sectional plane.

The image pickup station 40 includes a top board T for supporting the patient M, the X-ray tube R for emitting X rays in the form of a cone beam toward the patient M, and the flat panel X-ray detector D for detecting X rays transmitted through the patient M.

Figure 3:
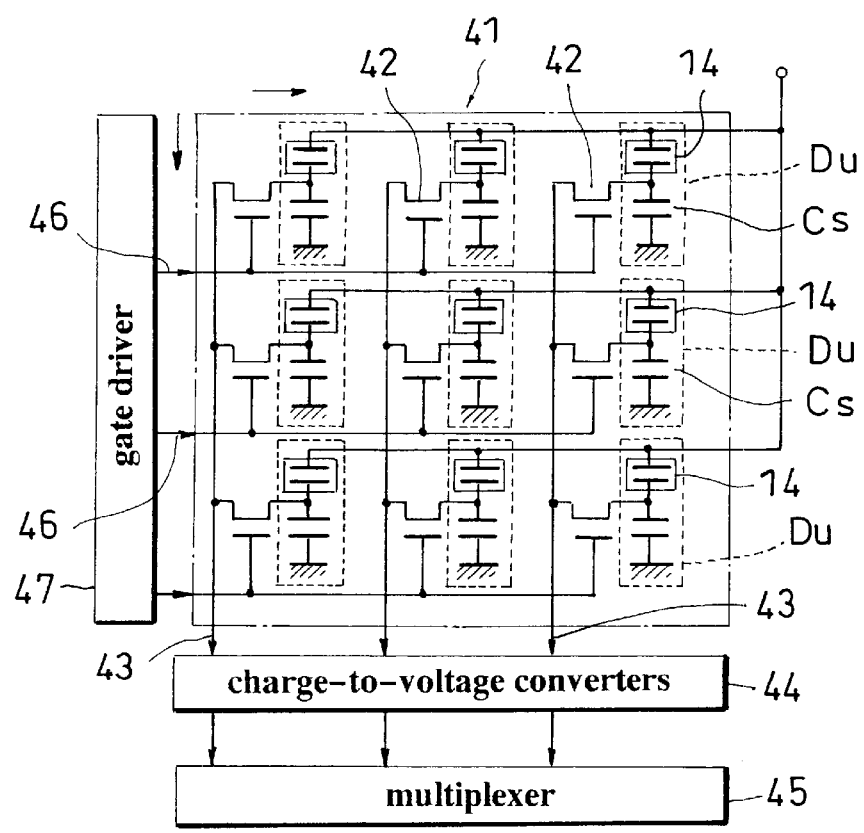
FIG. 3 is a view showing a construction of a flat panel X-ray detector.

The flat panel X-ray detector D is the type that detects fluoroscopic images of the patient M produced by the X-ray emission from the X-ray tube R, and converts the image data into electric signals for output as X-ray detection signals. As shown in FIG. 3, the X-ray detector D is in the form of a two-dimensional matrix with numerous detecting elements Du arranged in a crisscross pattern. The detecting elements Du of the flat panel X-ray detector D in this embodiment are arranged in a square matrix, e.g. 1,024 arranged sideways or in X-direction and 1,024 arranged vertically or in Y-direction. For expediency of description, the square matrix is assumed here to have 1,000 detecting elements Du arranged sideways and 1,000 detecting elements Du arranged vertically. FIG. 3 shows a matrix arrangement of only nine elements Du, i.e. 3 sideways and 3 vertically. As distinct from an image intensifier which must have a circular detecting plane, the flat panel X-ray detector D having a rectangular plane is useful in that it may have a square detecting plane suitable for detecting images of large sites such as the chest and abdomen.

Figure 4:
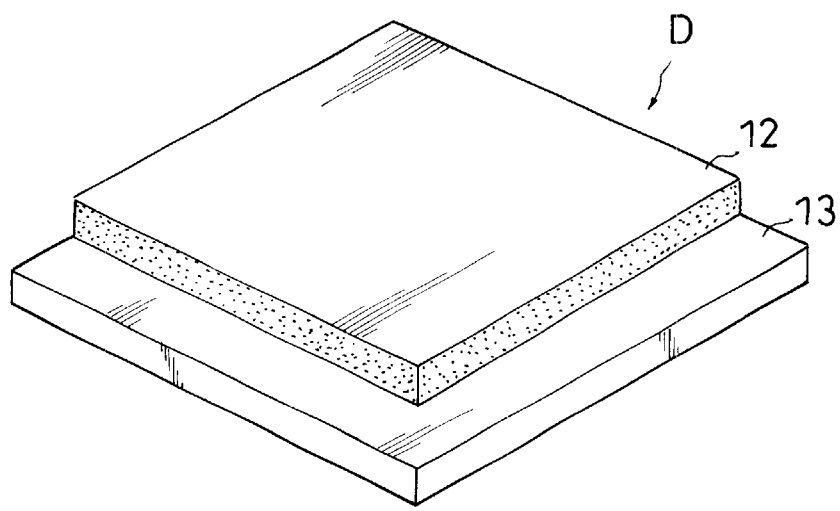
FIG. 4 is a perspective view showing an outline of the flat panel X-ray detector.

As shown in FIG. 4, the flat panel X-ray detector D has a laminated structure, and includes an X-ray converting layer 12 for converting incident X rays into electric charge or light, and a detecting array layer 13 having a matrix arrangement of elements for detecting the charge or light generated by the X-ray converting layer 12. The plane size of X-ray converting layer 12 of this flat panel X-ray detector D may be 30 cm by 30 cm, for example.

Figure 5A:
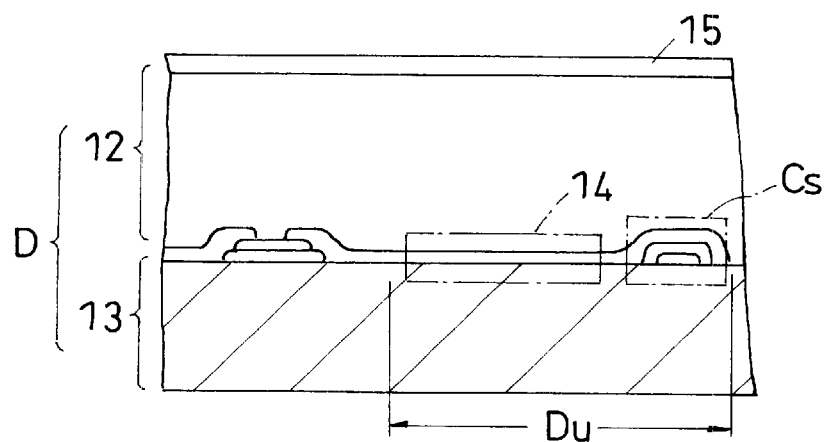
FIGS. 5A and 5B are sectional views showing a layer structure of the flat panel X-ray detector.
Figure 5B:
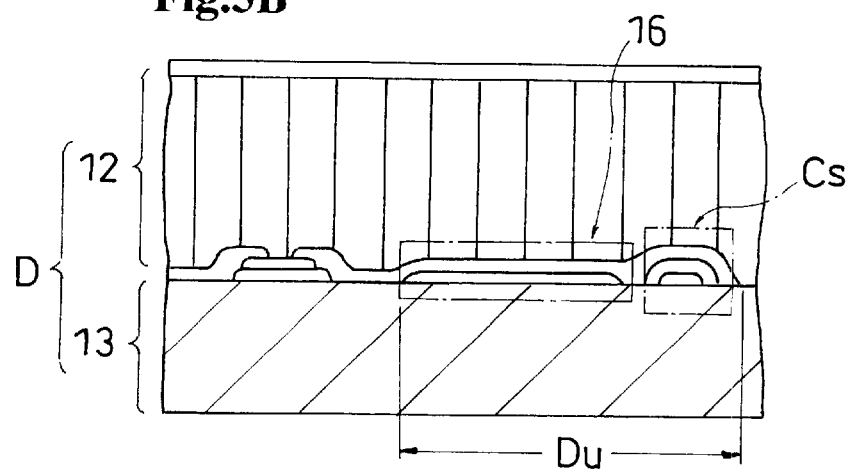

The flat panel X-ray detector D may be the direct conversion type shown in FIG. 5A or the indirect conversion type shown in FIG. 5B. In the former, direct conversion type, the X-ray converter layer 12 consists of a selenium layer, CdZnTe layer or the like for converting incident X rays directly into electric charges. The detecting array layer 13 has charge collecting electrodes formed on the surface thereof and opposed to a surface electrode 15 to act as charge detecting elements 14 for detecting the charges, and capacitors Cs for storing the charges. Each charge detecting element 14 and a part of X-ray conversion layer 12 thereover constitute one detecting element Du. In the latter, indirect conversion type, the X-ray converting layer 12 consists of a scintillator layer for converting incident X rays into light. The detecting array layer 13 has photodiodes formed on the surface thereof to act as photo detecting elements 16 for detecting the light, and capacitors Cs for storing electric charges. Each photo detecting element 16 and a part of X-ray conversion layer 12 thereover constitute one detecting element Du.

As shown in FIG. 3, the flat panel X-ray detector D includes an X-ray detector substrate 41 with the X-ray converting layer 12 and detecting array layer 13 formed thereon, the capacitors Cs for storing collected carriers (collected charges) from the carrier collecting electrodes (charge collecting electrodes) on the X-ray detector substrate 41, thin film transistors (TFT) acting as charge fetching switching elements 42, which are normally turned off, for fetching the charges stored in the capacitors Cs, and a multiplexer 45 and a gate driver 47 acting as reading circuits for X- and Y-directions.

As shown in FIG. 3, the flat panel X-ray detector D has the thin film transistors acting as the switching elements 42 of detecting elements Du. The thin film transistors have sources thereof connected to vertical sense lines 43 arranged in the direction along the X-axis, and gates connected to horizontal sense lines 46 arranged in the direction of Y-axis. The sense lines 43 are connected to the multiplexer 45 through a group of charge-to-voltage converters (group of preamplifiers) 44. The sense lines 46 are connected to the gate driver 47. In the group of charge-to-voltage converters 44, though not shown, one charge-to-voltage converter is connected to each sense line 43.

In the flat panel X-ray detector D, scan signals are inputted to the multiplexer 45 and gate driver 47 for fetching signals. The detecting elements Du are identified by means of addresses (0 to 999 since the number of detecting elements Du is 1,000; 0 to 1023 where 1024 detecting elements Du are provided) sequentially allocated to the detecting elements Du along the X- and Y-directions. Thus, the fetching scan signals serve as signals designating the addresses in the X-direction or Y-direction.

In response to scan signals for the Y-direction, the gate driver 47 applies a fetching voltage to the sense lines 46 arranged in the Y-direction, whereby detecting elements Du are selected on a column-by-column basis. When the multiplexer 45 is switched by scan signals for the X-direction, the charges stored in the capacitors Ca of the detecting elements Du in the selected columns are successively outputted through the charge-to-voltage converter group 44 and multiplexer 45. Thus, the flat panel X-ray detector D successively outputs detection signals to the data processor 50 in real time. The above flat panel X-ray detector D corresponds to the area detector in this invention.

The construction and functions of data processor 50 will be described next. The data processor 50 includes an image processor 51 for performing an image reconstruction to generate three-dimensional volume data of a region of interest from projection data (detection signals) detected in varied scan positions at the pickup station 40, and an image information storage 52 for storing the three-dimensional volume data of the region of interest generated by the image processor 51. Specific functions of the image processor 51 and image information storage 52 will be described hereinafter.

A series of processing steps for the image reconstruction by the image processor 51 to generate the three-dimensional volume data of the region of interest will be outlined with reference to FIG. 6. As shown in FIG. 6, the X-ray tube R and flat panel X-ray detector D are first driven to revolve along the circular tracks to scan and pick up images of the region of interest of patient M. This operation acquires a group of projection data of the region of interest detected in varied scan positions. FIG. 6 shows these projection data as "group of projection images". Next, the group of projection data is subjected to a simple back projection (simple BP) to generate a simple BP intermediate image. Next, the simple BP intermediate image is subjected to a three-dimensional Fourier transform to generate a three-dimensional Fourier distribution image which is Fourier space data converted from real space data (in FIG. 6, the three-dimensional Fourier distribution image is shown in three-dimensional Fourier space coordinates). Next, the three-dimensional Fourier distribution image receives a filtering process ($|\omega|$ filtering (absolute value $\omega$ filtering) and low-pass filtering) to be described hereinafter. Next, the three-dimensional Fourier distribution image filtered is subjected to a three-dimensional back Fourier transform to change the Fourier space data back to real space data and to generate three-dimensional volume data (in FIG. 6, this corresponds to the cylindrical object shown toward the right-hand end, with several dotted lines extending circumferentially). The image reconstruction is carried out in this way to generate three-dimensional volume data of the region of interest. The operator may observe an image of any sectional plane selected from the three-dimensional volume data (in FIG. 6, this corresponds to the thin cylindrical object shown at the extreme right-hand end). As noted above, a simple BP intermediate image is generated once, and a predetermined filtering process is carried out for the simple BP intermediate image in the Fourier space. This procedure is called an F (Fourier) space filter method.

Figure 7:
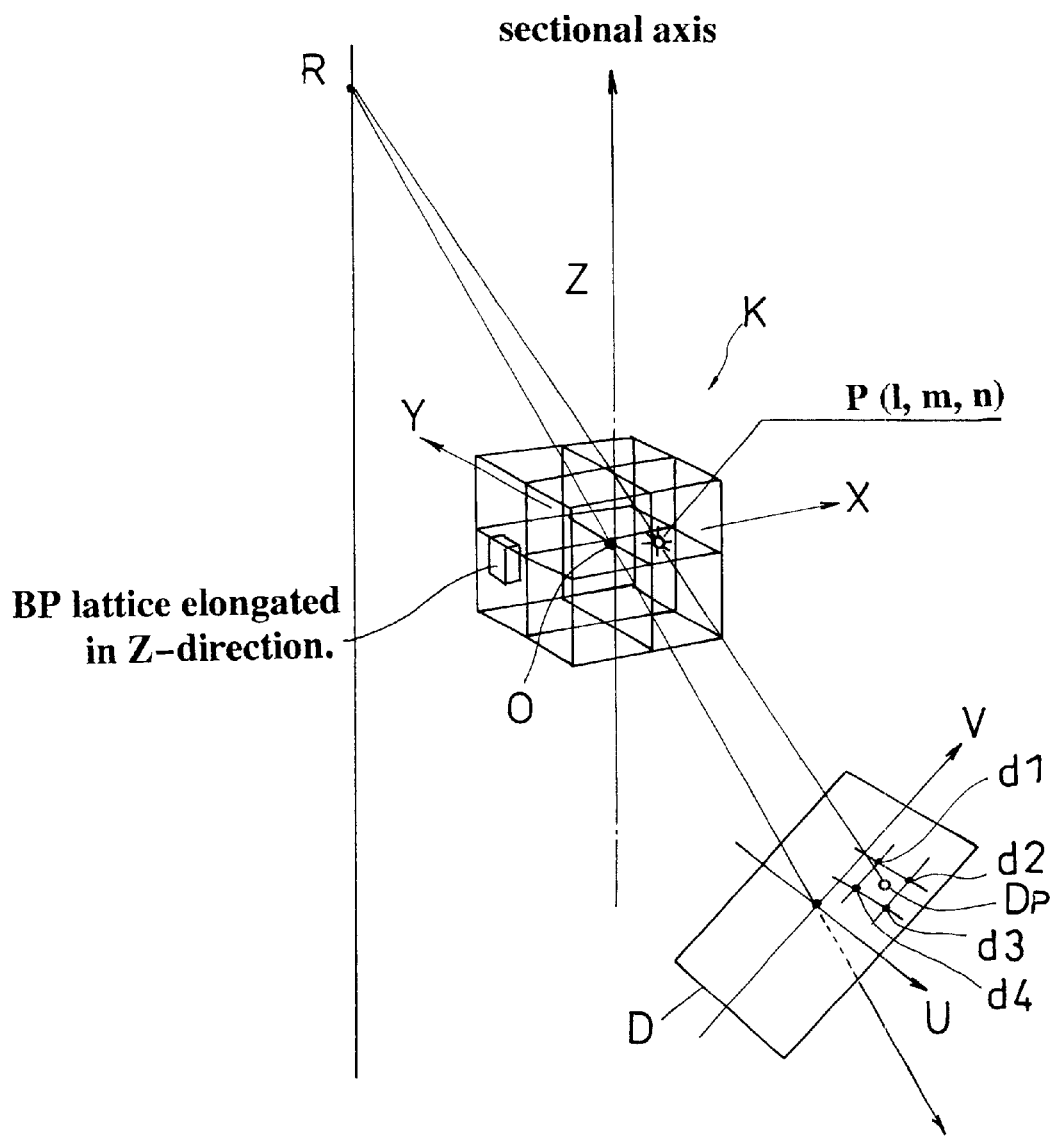
FIG. 7 is a schematic view illustrating a back projection by a back projection unit.

As shown in FIG. 1, the image processor 51 includes a back projection unit 53. The back projection unit 53 projects the group of projection data of the region of interest of patient M detected in the varied scan positions, back to predetermined lattice points of a three-dimensional lattice K virtually set to the region of interest as shown in FIG. 7, and performs an image reconstruction to generate three-dimensional volume data of the region of interest, that is to generate the simple BP intermediate image noted above. Further, the back projection unit 53 may generate three-dimensional volume data, with lattice spacing in the direction of an axis extending substantially through the center of the region of interest and perpendicular to the sectional planes being set larger than lattice spacing in the two other directions of the three-dimensional lattice K. This is one of the characterizing features of this invention.

As shown in FIG. 7, minimum lattice spacing along the axes of three-dimensional lattice K is dependent on pixel spacing of flat panel X-ray detector D. That is, the flat panel X-ray detector D has pixels arranged in a two-dimensional matrix of 1,000 by 1,000, and therefore the maximum number of lattice points in each of the directions along the three axes (X-, Y- and Z-axes) of three-dimensional lattice K is 1,000. In the first embodiment, the number of lattice points along each of the X- and Y-axes of three-dimensional lattice K is 1,000, while the number of lattice points along the Z-axis of three-dimensional lattice K is 500, for example. That is, the number of lattice points along the Z-axis is ½ of the number of lattice points along the X- or Y-axis. The lattice spacing along the Z-axis may be said twice as large as that along the X- or Y-axis. To what extent the lattice spacing along the Z-axis should be made larger than that along the X- or Y-axis may be varied as desired by a setting inputted by the operator through the input unit 10.

Figure 8A:
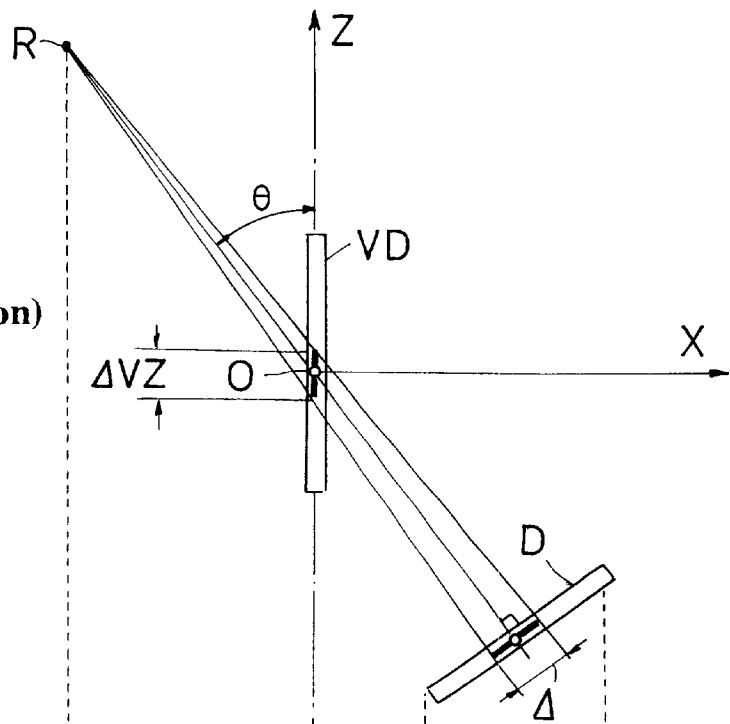
FIGS. 8A and 8B are schematic views illustrating a relationship between detection pixel lengths of the axes of a three-dimensional lattice and a pixel pitch of the flat panel X-ray detector.
Figure 8B:
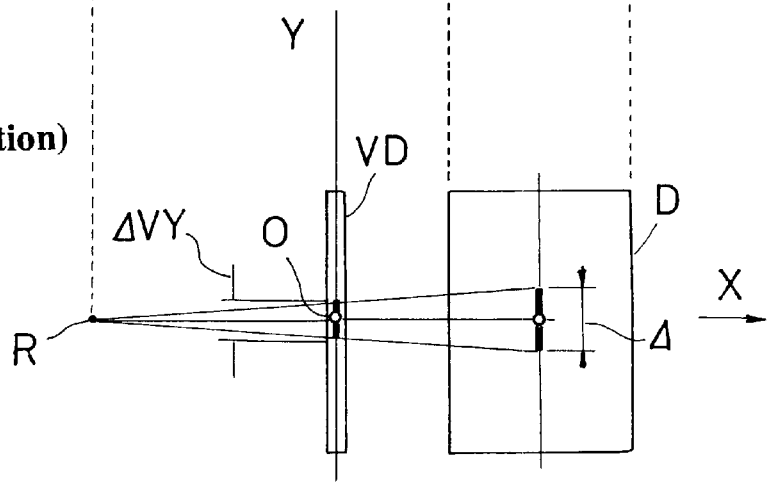

The relationship between lattice spacing along the axes of three-dimensional lattice K and pixel spacing of flat panel X-ray detector D will be described in greater detail now. As shown in FIGS. 8A and 8B, the pixel spacing of flat panel X-ray detector D and the lattice spacing along the Z- and Y-axes of the three-dimensional lattice, i.e. a detection pixel length $\Delta VZ$ along the Z-axis (detection pixel length along the sectional axis) and a detection pixel length $\Delta VY$ (detection pixel length along a sectional plane), are in relations expressed by equations (1) and (2) set out hereunder. As shown in FIG. 8, the detection pixel lengths along the Z- and Y-axes are based on the condition that the flat panel X-ray detector D is perpendicular to X-ray axis RD. It is assumed that RO=d1 and RD=d2 and that one pixel pitch on the flat panel X-ray detector D is $\Delta(=\Delta U, \Delta V)$.

Corresponding one pixel pitch $\Delta VZ$ along the Z-axis (detection pixel length along the Z-axis) of a virtual vertical area detector VD disposed on the Z-axis (sectional axis) is derived from equation (1). Corresponding one pixel pitch $\Delta VY$ along the Y-axis (detection pixel length along the Y-axis) of the virtual vertical area detector VD is derived from equation (2).

$$\Delta VZ = \Delta \cdot d1/d2/\sin\theta \quad (1)$$

$$\Delta VY = \Delta \cdot d1/d2 \quad (2)$$

When radiography performed with the conditions that, for example, $\Delta(=\Delta X, \Delta Y)$ is 160 μm, d1 is 700 mm, d2 is 1,200 mm, and $\Theta$ is 30°, $\Delta VZ$ will be 186.6 μm and $\Delta VY$ 93.3 μm. The detection pixel length along the Z-axis is in inverse proportion to sin θ, and is greater than the detection pixel length along the X- or Y-axis. The above equations (1) and (2) are adopted as a basis also where the lattice spacing along the Z-axis is twice as long as that along the X- or Y-axis of the three-dimensional lattice K virtually set to the region of interest of patient M imaged.

The back projection unit 53 projects the projection data detected in the varied scan positions by the flat panel X-ray detector D back to the three-dimensional lattice with elongated lattice spacing along the Z-axis as noted above. This operation of back projection unit 53 will be described next. As shown in FIG. 7, detection data to be projected back to a given lattice point P (l, m, n) of three-dimensional lattice K, for example, is determined by obtaining a weighted mean of values of four pixels d1–d4 closest to a dot Dp where a straight line extending from the X-ray tube R through the lattice point P (l, m, n) intersects with the flat panel X-ray detector D. A pixel value derived from the weighted mean is projected back to the given lattice point P (l, m, n) of the three-dimensional lattice. A similar back projection is carried out for remaining predetermined lattice points of the three-dimensional lattice, and for all of the scan positions, thereby to generate a simple BP intermediate image.

The image processor 51 further includes a three-dimensional Fourier transform unit 54 for performing a three-dimensional Fourier transform of the three-dimensional volume data generated by the back projection unit 53, a filtering unit 55 for performing a predetermined filtering process (e.g. $|\omega|$ filtering and low-pass filtering) on Fourier space data (three-dimensional Fourier distribution image) resulting from the three-dimensional Fourier transform, and a three-dimensional back Fourier transform unit 56 for performing a three-dimensional back Fourier transform of the Fourier space data (three-dimensional Fourier distribution image) filtered by the filtering unit 55, and putting the data back to three-dimensional volume data.

The three-dimensional Fourier transform unit 54 performs the three-dimensional Fourier transform of the three-dimensional volume data generated by the back projection unit 53 based on the following equation (3):

$$F(\omega X, \omega Y, \omega Z) = \int\int\int f(X, Y, Z) \cdot \exp\{-j(\omega X \cdot X + \omega Y \cdot Y + \omega Z \cdot Z)\} dX \cdot dY \cdot dZ \quad (3)$$

where f(X, Y, Z) is the simple BP intermediate image, and X, Y and Z are real numbers.

Further, the three-dimensional Fourier transform unit 54 performs a rearrangement to place DC components in the center of the Fourier space, to obtain the three-dimensional Fourier distribution image with three-dimensional Fourier space coordinates as shown in FIG. 6.

Figure 10:
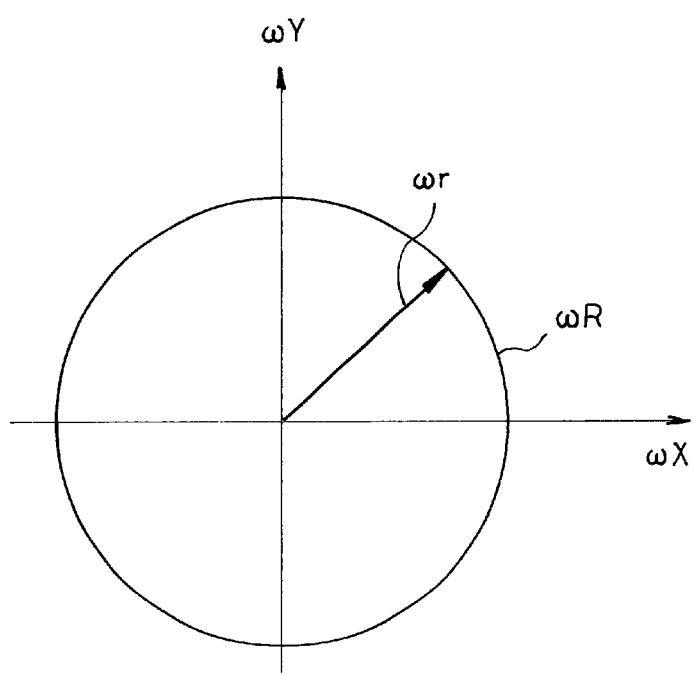
FIG. 10 is a schematic view showing a radius ωr of an ωX-ωY plane.

The filtering unit 55 may be said to have three filters as described next, when its functions are broadly classified. Thus, as shown in FIG. 6, a Fourier space low-pass filtering unit applies a low-pass filter in the direction of the sectional axis (($\omega$-axis) of the Fourier space data (three-dimensional Fourier distribution image) having undergone the three-dimensional Fourier transform. An $|\omega|$ filtering unit includes a filter for suppressing high frequency noise by isotropically reducing the high frequency regions in the direction of $\omega R$ (in the direction of a plane formed by the $\omega$-axis and $\omega Y$-axis of the Fourier space: see FIG. 10), and a filter dependent on a data collection scan mode. The filter dependent on a data collection scan mode performs filtering action proportional to $|\omega|$ in the $\omega R$ plane to correct crowding on the $\omega Z$-axis of the three-dimensional Fourier distribution image, by being scanned by the revolution about the Z-axis in the two planes opposed to each other across the patient M. That is, when the three-dimensional back Fourier transform is performed on the filtered three-dimensional Fourier distribution image, DC components are suppressed in the three-dimensional volume data generated. This reduces artifacts caused by the DC components being emphasized.

The meaning of the filtering process performed in the three-dimensional Fourier space will be described now. The filtering process performed in the three-dimensional Fourier space is mathematically expressed by the following equation (4):

$$FM(\omega X, \omega Y, \omega Z) = F(\omega X, \omega Y, \omega Z) \times M(\omega X, \omega Y, \omega Z) \quad (4)$$

where FM ($\omega$X, $\omega$Y, $\omega$Z) is the filtered three-dimensional Fourier distribution image, and M ($\omega$X, $\omega$Y, $\omega$Z) is a function representing filter characteristics of the above filtering unit 55.

Figure 11:
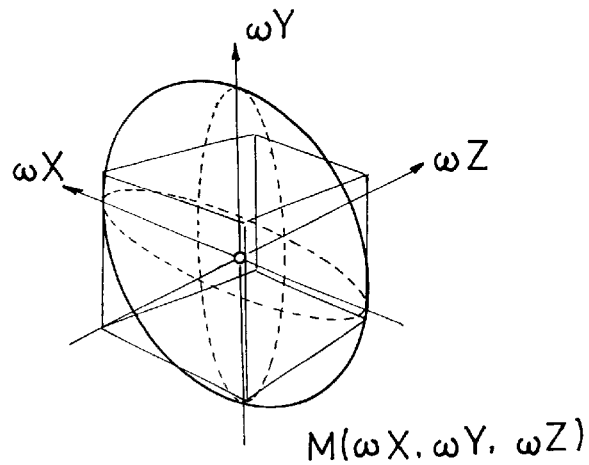
FIG. 11 is a schematic view showing a filter function of a filtering unit in the first embodiment superimposed on the three-dimensional Fourier distribution image.

As shown in FIG. 11, a distribution of the above filter function M ($\omega$X, $\omega$Y, $\omega$Z) is visualized as superimposed on the three-dimensional Fourier distribution image in the three-dimensional Fourier space. The filtering process performed in the three-dimensional Fourier space is to weight the three-dimensional Fourier distribution image which is a complex data, with the real-valued filter function M dependent on respective frequency values. The weighting function M presents a "pancake" spheroid shape compressed in $\omega$Z-direction. M ($\omega$X, $\omega$Y, $\omega$Z) is expressed by the following equation (5) as a product of three functions representing the filter characteristics:

$$M(\omega X, \omega Y, \omega Z) = \text{Mdepth}(\omega Z) \cdot Mr(\omega r) \cdot M\omega(\omega R) \quad (5)$$

A typical example of each filter function system shown in the equation (5) will be described hereinafter.

Figure 12A:
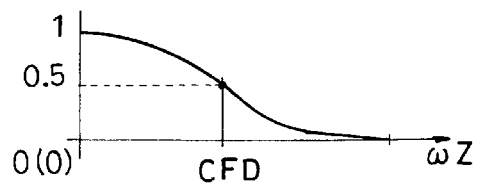
FIGS. 12A–C are characteristic views showing the filter function of the filtering unit in the first embodiment.

Mdepth ($\omega$Z) has a low-pass filter characteristic shown in FIG. 12A, i.e. Gaussian characteristic, which is expressed by the following equation (6):

$$\text{Mdepth}(\omega Z) = \exp\{-0.693 \cdot (\omega Z/CFD)^2\} \quad (6)$$

where CFD is a frequency with a Gaussian attenuation halved (see FIG. 12A).

Figure 12B:
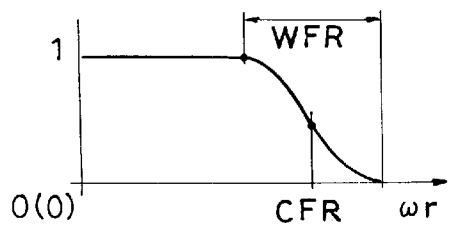

Mr ($\omega$r) has a filter characteristic shown in FIG. 12B, which is expressed by the following equations (7)–(9):

$$Mr(\omega r) = 1 \text{ (where } \omega r < CFR - WFR/2) \quad (7)$$

$$Mr(\omega r) = \{1 - \sin((\omega r - CFR)\pi/WFR)\}/2 \text{ (where } CFR - WFR/2 < \omega or < CFR + WFR/2) \quad (8)$$

$$Mr(\omega r) = 0 \text{ (where } CFR + WFR/2 < \omega r) \quad (9)$$

However, $\omega r = \sqrt{(\omega X^2 + \omega Y^2 + \omega Z^2)}$. The function has a sine wave form with high frequency components smoothly attenuating as shown in FIG. 12B. CFR is a cutoff frequency, and WFR is a total transition frequency width of filter strength (see FIG. 12B). This Mr ($\omega$r) deletes components (high frequency components) that are away from the origin of the three-dimensional Fourier space shown in FIG. 10.

Figure 12C:
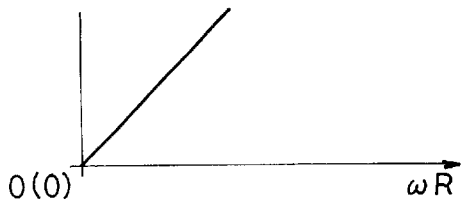

M$\omega$ ($\omega$R) has a filter characteristic shown in FIG. 12C, which is expressed by the following equation (10):

$$M\omega(\omega R) = |\omega| \quad (10)$$

where $\omega R = \sqrt{(\omega X^2 + \omega Y^2)}$.

FIGS. 12A–C show only the characteristics in the plus direction along the horizontal axis. The characteristics in the minus direction along the horizontal axis are omitted since these are in linear symmetry with the characteristics in the plus direction about the vertical axis.

Figure 9:
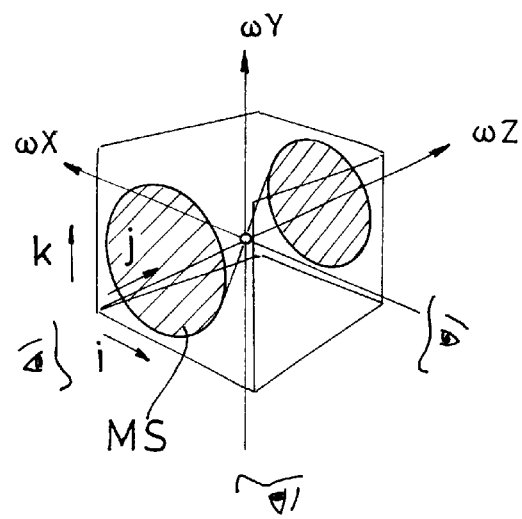
FIG. 9 is a schematic view showing a three-dimensional Fourier distribution image with missing cones present in the direction along an ωZ-axis.

The Fourier space low-pass filtering unit will be described in greater detail now. As shown in FIG. 12A, the Fourier space low-pass filtering unit has a Gaussian low-pass filter characteristic expressed by the above Mdepth ($\omega$Z). This low-pass filtering unit applies a low-pass filter in the direction of the sectional axis ($\omega$Z-axis) of the Fourier space data (three-dimensional Fourier distribution image), shown in FIG. 9, which has undergone a three-dimensional Fourier transform. The necessity of this low-pass filtering will be discussed below. As shown in FIG. 9, the Fourier space data (three-dimensional Fourier distribution image) having undergone the three-dimensional Fourier transform has two missing cones MS centering on the $\omega$Z-axis, with the vertices thereof meeting at the origin of the Fourier space coordinates. The two missing cones MS are void of data. These two cones MS result from the non-CT type radiography in which revolving scans are made about the sectional axis and in the two planes opposed to each other across the patient M. That is, the radiography is carried out without driving the X-ray tube R and flat panel X-ray detector D to make more than a half revolution about the body axis of patient M. This results in low resolution in the direction of the sectional axis (Z-axis), thereby generating the missing cones MS. Thus, the Fourier space low-pass filtering unit is characterized by applying a low-pass filter in the direction of the sectional axis ($\omega$Z-axis) to lessen influences of the two missing cones MS shown in FIG. 9.

Figure 13A:
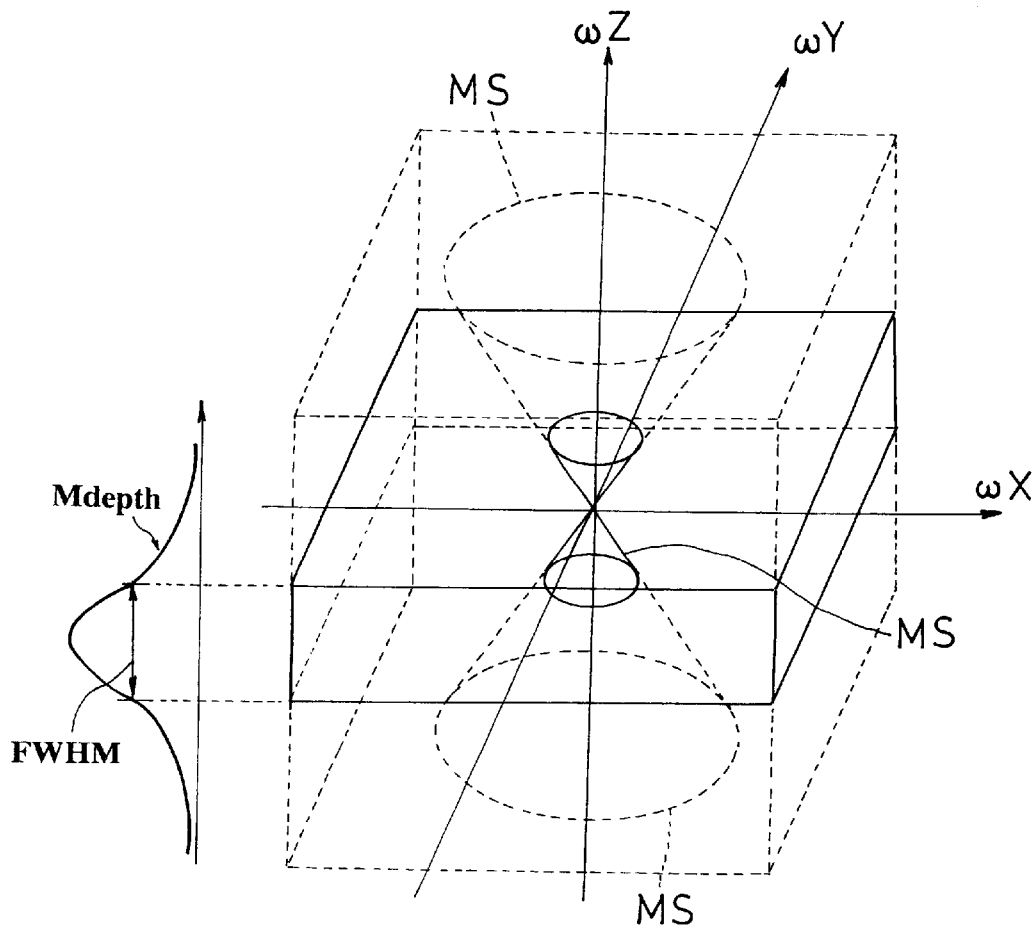
FIG. 13A is a perspective view schematically showing the three-dimensional Fourier distribution image with the missing cones present along the ωZ-axis.
Figure 13B:
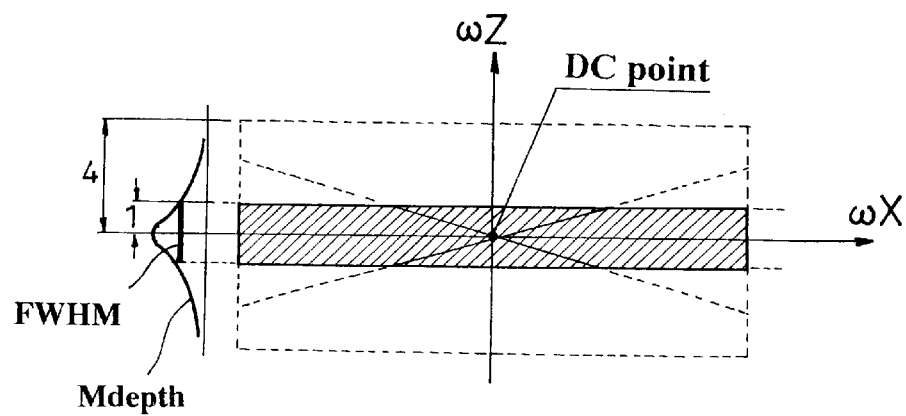
FIG. 13B is a side view of the three-dimensional Fourier distribution image shown in FIG. 13A.

Specifically, as shown in FIG. 13A, the two missing cones MS are present along the sectional axis ($\omega$Z-axis) of the Fourier space data (three-dimensional Fourier distribution image). A low-pass filter is applied along the sectional axis, which filter corresponds to a detection pixel length along the sectional axis enlarged by the back projection unit 53 to be four times as large as those along the X- and Y-axes. That is, as shown in FIG. 13B, the low-pass filter is applied such that, where the length from the origin on the Z-axis of the three-dimensional Fourier distribution image to a high frequency component is assumed to be "4", the length from a peak of a Gaussian function to a half value width FWHM is "1". When the low-pass filter function Mdepth ($\omega$Z) corresponding to four times the detection pixel length along the sectional axis is applied to the three-dimensional Fourier distribution image, shown in broken lines in FIG. 13A, before a low-pass filtering process, the high frequency components along the sectional axis ($\omega$Z-axis) are cut off to produce a low-pass filtered three-dimensional Fourier distribution image shown in solid lines in FIG. 13A (i.e. a three-dimensional Fourier distribution image corresponding to the half value width FWHM of low-pass filter function Mdepth ($\omega$Z)). As shown in FIGS. 13A and 13B, the missing cones MS have a smaller proportion to the entire three-dimensional Fourier distribution image after the low-pass filtering process than to the entire three-dimensional Fourier distribution image before the low-pass filtering process. This results in reduced influences of the missing cones MS on the three-dimensional Fourier distribution image, thereby reducing artifacts in the three-dimensional volume data generated by a three-dimensional back Fourier transform described hereinafter.

The three-dimensional back Fourier transform unit 56 puts the Fourier space data having undergone the low-pass filtering by the Fourier space low-pass filtering unit, back to three-dimensional volume data by performing a three-dimensional back Fourier transform expressed by the following equation (11):

$$fm(X, Y, Z) = \tfrac{1}{8}\pi^3 \iiint FM(\omega X, \omega Y, \omega Z) \cdot \exp\{j(\omega X X + \omega Y Y + \omega Z Z)\} d\omega X \cdot d\omega Y \cdot d\omega Z \quad (11)$$

where FM ($\omega$X, $\omega$Y, $\omega$Z) is the three-dimensional Fourier distribution image after the filtering process, and fm (X, Y, Z) is the three-dimensional volume data resulting from the three-dimensional back Fourier transform.

The image information storage 52 stores the three-dimensional volume data resulting from the three-dimensional back Fourier transform by the three-dimensional back Fourier transform unit 56. When the input unit 10 is operated to select image information of any given slice, this image information is outputted to the monitor 60.

The monitor 60 has a function to display selected image information stored in the image information storage 52.

Operation of the apparatus in the first embodiment having the above construction will be described next. First, before picking up images of the region of interest of patient M, the operator inputs various settings from the input unit 10. These settings include a distance from the X-ray tube R to the flat panel X-ray detector D, radii of the circles (e.g. 50 to 100 cm) along which the X-ray tube R and flat panel X-ray detector D are to be revolved, the number of views to be acquired (100 to 500), or intervals at which images are to be picked up, while the X-ray tube R and flat panel X-ray detector D are revolved, and a lattice spacing along the Z-axis of the three-dimensional lattice which is, for example, four times as large as the lattice spacing along the X- and Y-axes.

As shown in FIG. 6, the X-ray tube R and flat panel X-ray detector D are revolved along the circular tracks to pick up images of the region of interest of patient M. This step acquires a group of projection data of the region of interest of patient M detected in varied scan positions.

The back projection unit 53, as noted above, simply projects the projection data back to the three-dimensional lattice (simple BP) to generate a simple BP intermediate image.

Next, the three-dimensional Fourier transform unit 54 performs a three-dimensional Fourier transform of the simple BP intermediate image generated by the back projection unit 53, for conversion from real space data to Fourier space data.

Next, as described hereinbefore, the filtering unit 55 performs a filtering process ($|\uparrow\omega|$ filtering and low-pass filtering) on the Fourier space data having undergone the three-dimensional Fourier transform by the three-dimensional Fourier transform unit 54.

Next, the three-dimensional back Fourier transform unit 56 performs a three-dimensional back Fourier transform of the Fourier space data filtered by the filtering unit 55, to put the Fourier space data back to real space data, and generate three-dimensional volume data. In this way, an image reconstruction is carried out to generate three-dimensional volume data of the region of interest.

The image information storage 52 stores the three-dimensional volume data resulting from the three-dimensional back Fourier transform by the three-dimensional back Fourier transform unit 56. Image information of each slice or section among the three-dimensional volume data stored in the image information storage 52 may be displayed on the monitor 60 in response to an instruction inputted by the operator. For example, the image information of a slice selected by the operator is read from the three-dimensional volume data, and displayed on the monitor 60.

In the first embodiment described above, the back projection unit 53 projects projection data detected in varied scan positions back to predetermined lattice points of the three-dimensional lattice K virtually set to the region of interest of patient M imaged. The three-dimensional lattice K with the three orthogonal axes is such that lattice spacing along the axis (Z-axis) extending substantially through the center of the region of interest and perpendicular to the sectional planes is set larger than lattice spacing in the two other directions (i.e. along X- and Y-axes) of the three-dimensional lattice K. In this way, an image reconstruction is carried out to generate three-dimensional volume data of the region of interest. Compared with a back projection to a conventional three-dimensional lattice having an equal lattice spacing along the three axes, the data back-projected may be reduced by an amount corresponding to the enlarged lattice spacing in the direction along the sectional axis of three-dimensional lattice K over the lattice spacing in the two other directions. The processing time for the image reconstruction may be shortened accordingly. The back projection may be done without wasting the image information in the direction along the sectional axis.

The driver 30 drives the X-ray tube R to revolve in one of the parallel planes opposed to each other across the patient M, and the flat panel X-ray detector D to revolve synchronously therewith in the other plane in the direction counter to the direction of revolution of X-ray tube R. Thus, the X-ray tube R and flat panel X-ray detector D are revolved in the separate parallel planes opposed to each other across the patient M. Radiography may be thereby performed for an image reconstruction to generate three-dimensional volume data of the region of interest of patient M.

The Fourier space low-pass filtering unit applies a low-pass filter in the direction along the sectional axis of the Fourier space data having undergone a three-dimensional Fourier transform. This process is effective to reduce artifacts in the three-dimensional volume data generated by a three-dimensional back Fourier transform of the Fourier space data after the low-pass filtering.

Figure 14:
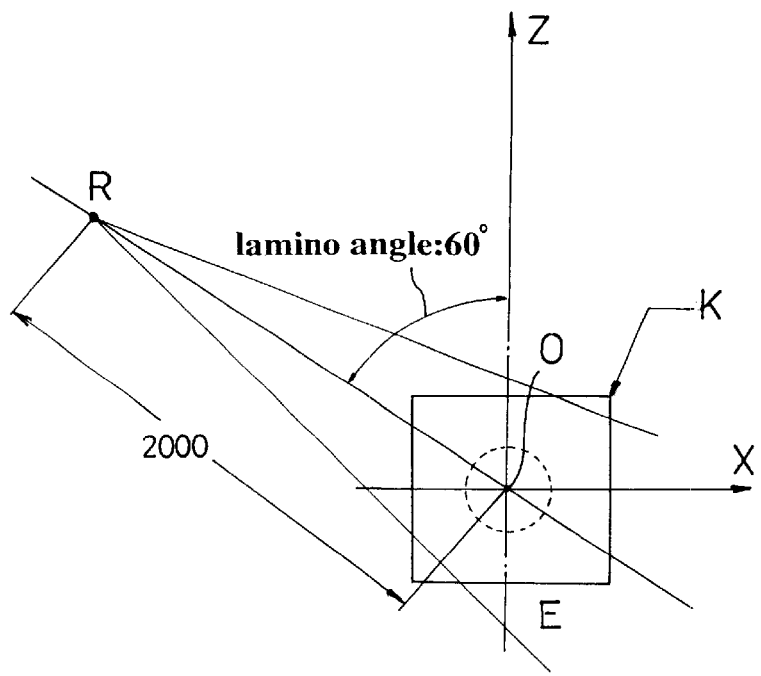
FIG. 14 is a schematic view illustrating a simulation of a low-pass filtering effect.
Figure 15A:
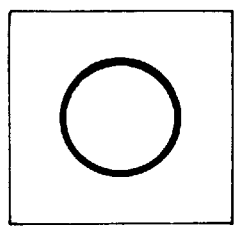
FIGS. 15A–C are views showing real space sectional images on planes perpendicular to the respective axes before a low-pass filtering.
Figure 15B:
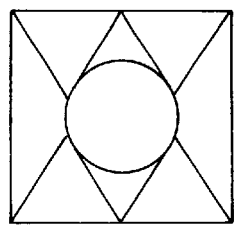
Figure 15C:
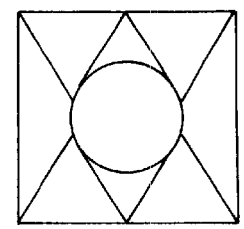
Figure 15D:
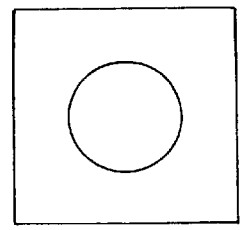
FIGS. 15D–F are views showing real space sectional images on the planes perpendicular to the respective axes after the low-pass filtering.
Figure 15E:
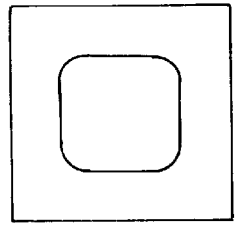
Figure 15F:
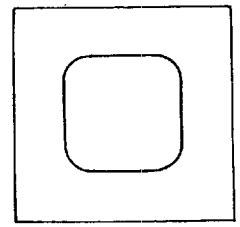

The effect of low-pass filtering will now be described by using results of a simulation of low-pass filtering by the Fourier space low-pass filtering unit. The simulation of low-pass filtering has been carried out with the following conditions. As shown in FIG. 14, the object under examination is assumed to be a ball E of 8 mm in radius, a distance from the X-ray tube R to the ball E to be 2000 mm, scanning to be done by revolving along a circle having a lamino angle (corresponding to angle θ noted hereinbefore) of 60 degrees, the three-dimensional lattice K virtually set to have 33 lattice points along each axis, and the size of the three-dimensional lattice K (reconstruct area) to be $33^3$. Sectional images of the ball E are picked up by the circular scanning motion as shown in FIG. 14, and a simple BP intermediate image is obtained by a back projection of projection data acquired in varied scan positions. FIG. 15A shows an image, taken from the simple BP intermediate image, of a sectional plane including the center of ball E and perpendicular to the Z-axis. FIG. 15B shows an image, taken from the same intermediate image, of a sectional plane including the center of ball E and perpendicular to the X-axis. FIG. 15C shows an image, taken from the same intermediate image, of a sectional plane including the center of ball E and perpendicular to the Y-axis. The simple BP intermediate image is subjected to a low-pass filtering process in the Fourier space, and put back to the real space to generate three-dimensional volume data. FIG. 15D shows an image, taken from this volume data, of the plane including the center of ball E and perpendicular to the Z-axis. FIG. 15E shows an image, taken from the same volume data, of the plane including the center of ball E and perpendicular to the X-axis. FIG. 15F shows an image, taken from the same volume data, of the plane including the center of ball E and perpendicular to the Y-axis.

As seen from the image of the sectional plane perpendicular to the Z-axis shown in FIG. 15A, artifacts are produced to blur the outline of ball E (the blur of the outline of ball E being depicted in a thick line in FIG. 15A). As seen from the images of the sectional planes perpendicular to the X- and Y-axes shown in FIGS. 15B and 15C, tangential artifacts appear that correspond to the lamino angle. FIGS. 15B and 15C depict the tangential artifacts in inclined straight lines over and under the ball E. By contrast, as seen from the image of the sectional plane perpendicular to the Z-axis shown in FIG. 15D, the artifacts blurring the outline of ball E are reduced after the low-pass filtering process (a sharpened outline of ball E being depicted in a thin line in FIG. 15D) to provide a clear sectional image. As seen from the images of the sectional planes perpendicular to the X- and Y-axes shown in FIGS. 15E and 15F, the tangential artifacts corresponding to the lamino angle are eliminated though the images are blurred along the Z-axis (FIGS. 15E and 15F depicting the blur by enlarging the ball E sideways).

Figure 16A:
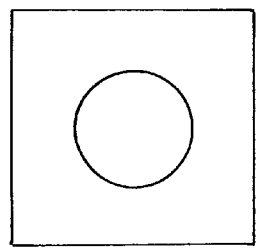
FIGS. 16A–C are views showing Fourier space sectional images on the planes perpendicular to the respective axes before the low-pass filtering.
Figure 16B:
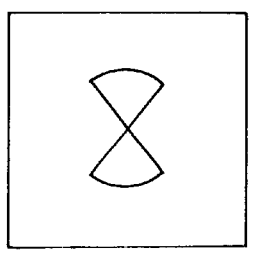
Figure 16C:
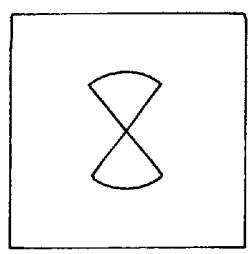
Figure 16D:
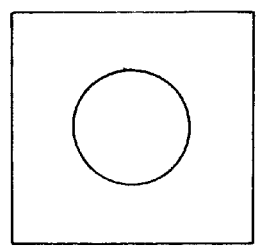
FIGS. 16D–F are views showing Fourier space sectional images on the planes perpendicular to the respective axes after the low-pass filtering.
Figure 16E:
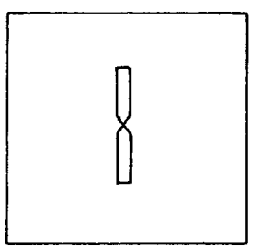
Figure 16F:
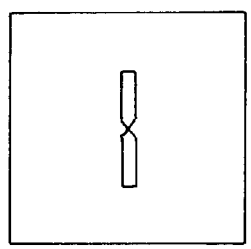

FIGS. 16A–C show Fourier space data generated by a three-dimensional Fourier transform of the simple BP intermediate image. FIGS. 16D–F show Fourier space data after the low-pass filtering process. FIG. 16A shows a distribution image of a plane including the origin of Fourier coordinates and perpendicular to the ωZ-axis. FIG. 16B shows a distribution image of a plane including the origin of Fourier coordinates and perpendicular to the ωX-axis. FIG. 16C shows a distribution image of a plane including the origin of Fourier coordinates and perpendicular to the ωY-axis.

FIG. 16D shows a distribution image of the plane including the origin of Fourier coordinates and perpendicular to the ωZ-axis. FIG. 16E shows a distribution image of the plane including the origin of Fourier coordinates and perpendicular to the ωX-axis. FIG. 16F shows a distribution image of the plane including the origin of Fourier coordinates and perpendicular to the ωY-axis. Before the low-pass filtering process, two missing cones are present as shown in FIGS. 16B and 16C. After the low-pass filtering process, as shown in FIGS. 16E and 16F, the missing cones shown in FIGS. 16B and 16C have become thin bar-shaped. It can be confirmed that the influences of the missing cones have diminished.

It has been found, as seen from the results of the above simulation of low-pass filtering, that a sufficient artifact suppressing effect is produced only when the Fourier space low-pass filtering unit applies a low-pass filter to diffuse at least four times the detection pixel length along the sectional axis (Z-axis). Of course, application of a low-pass filter exceeding the above value will further suppress artifacts, but the number of independent sectional images will decrease accordingly.

Figure 17:
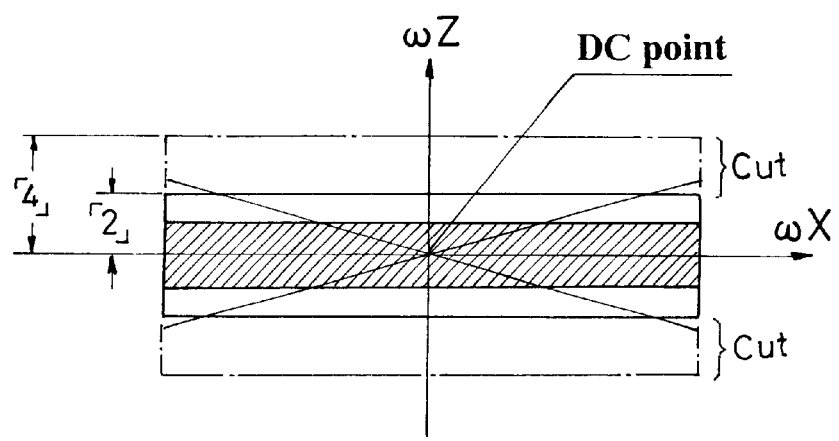
FIG. 17 is a view illustrating a further low-pass filtering process applied to the three-dimensional Fourier distribution image having undergone a low-pass filtering.

In the first embodiment described above, a three-dimensional back Fourier transform is carried out with the low-pass filter (e.g. the back projection processor 53 applying a low-pass filter corresponding to the detection pixel length along the sectional axis eight times as long as the detection pixel length along the other, X- and Y-axes) applied along the sectional axis (ωZ-axis) of the Fourier space data (three-dimensional Fourier distribution image). High frequency components in the direction along the sectional axis (ωZ-axis) of the Fourier space data after the low-pass filtering may be cut (see FIG. 17), thereby lessening the number of sectional images of the three-dimensional volume data subsequently subjected to the three-dimensional back Fourier transform by the three-dimensional back Fourier transform unit 56. That is, no problem will arise where little difference is found between adjacent sectional images (e.g. a first and a second sectional images) in the direction along the sectional axis (Z-axis) of the three-dimensional volume data. Three-dimensional volume data diffused in the direction along the sectional axis may be generated by a three-dimensional back Fourier transform of image information lessened along the sectional axis (Z-axis). Assume that the size along the sectional axis (ωZ-axis) of the Fourier space data is "4" as shown in FIG. 17, portions "2" along the sectional axis (ωZ-axis) of the Fourier space data are cut as referenced "Cut" in the figure, leaving portions "2" including DC components along the sectional axis (ωZ-axis) of the Fourier space data. The three-dimensional back Fourier transform of the space data, with such portions cut by the low-pass filtering as above, halves the number of sectional images in the direction along the sectional axis (Z-axis) of the three-dimensional volume data generated. This reduces the processing time for the three-dimensional back Fourier transform, and the number of sectional images in the direction along the sectional axis (Z-axis), which is effective where there is no need to reproduce images at small intervals along the sectional axis (Z-axis).

<Second Embodiment>

Figure 18:
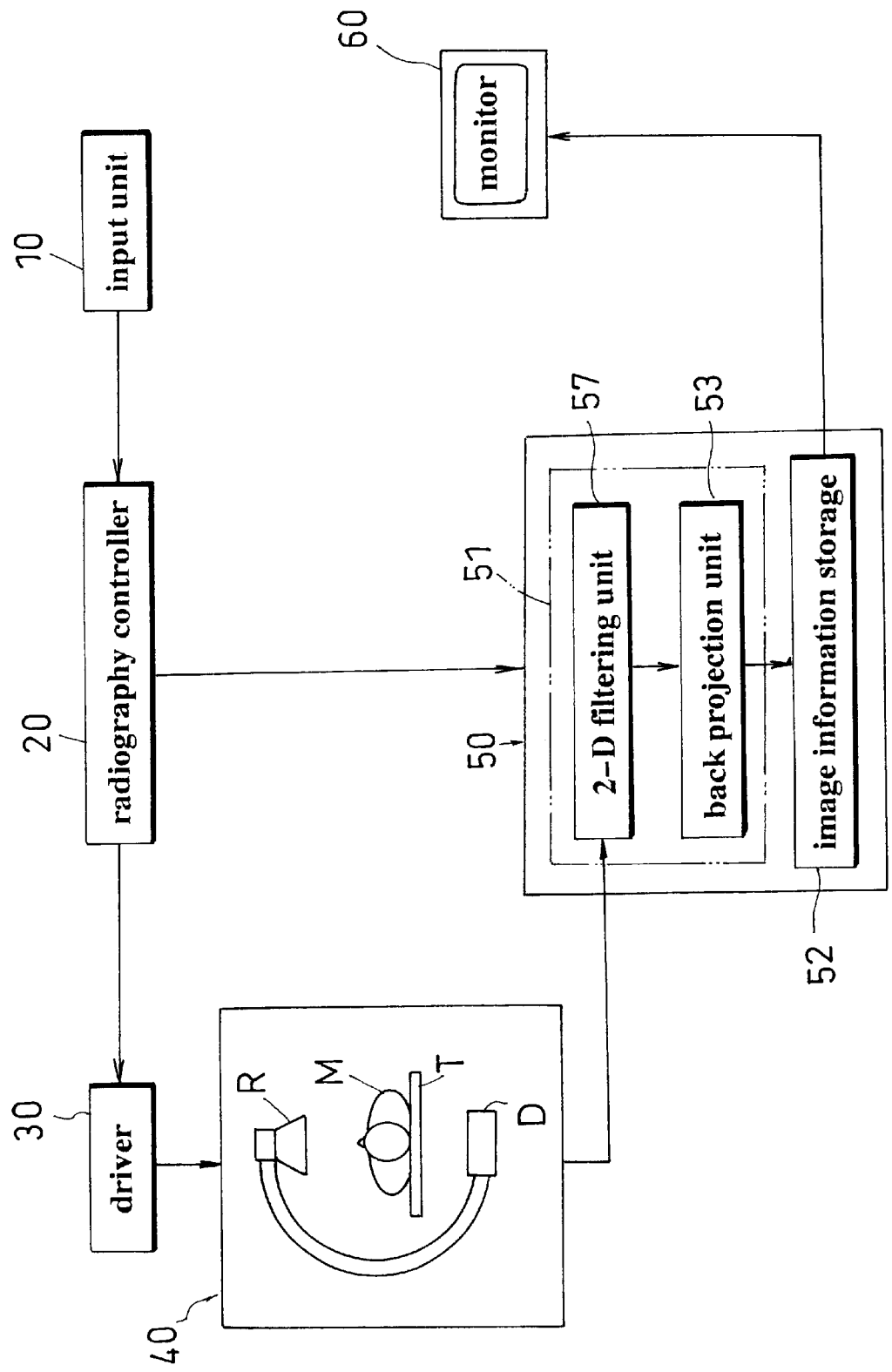
FIG. 18 is a block diagram of an X-ray radiographic apparatus in a second embodiment.

An X-ray radiographic apparatus in a second embodiment of this invention will be described next. FIG. 18 is a block diagram of the X-ray radiographic apparatus in the second embodiment. This X-ray radiographic apparatus is the same as the apparatus in the first embodiment except the image processor 51. Thus, the construction and functions of the image processor 51 will be described in detail.

Figure 19:
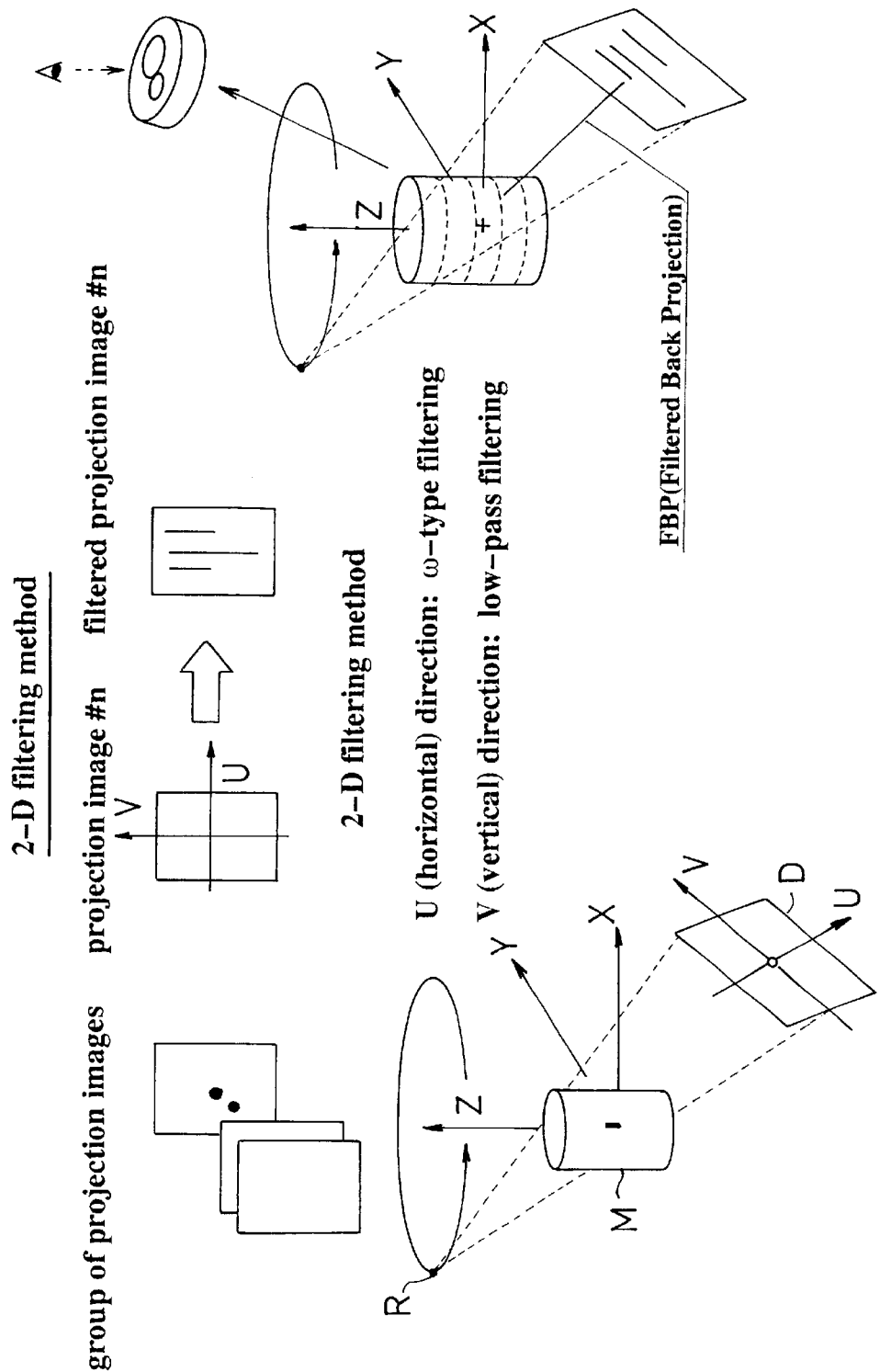
FIG. 19 is a schematic view illustrating a series of processing steps performed by an image processor in the second embodiment.

A series of processing steps for the image reconstruction by the image processor 51 to generate three-dimensional volume data of the region of interest will be outlined with reference to FIG. 19. As shown in FIG. 19, the X-ray tube R and flat panel X-ray detector D are first driven to revolve along the circular tracks to scan and pick up images of a region of interest of patient M. This operation acquires a group of projection data of the region of interest detected in varied scan positions. FIG. 19 shows these projection data as "group of projection images". Next, the group of projection data is subjected to a filtering process (|ω| filtering (i.e. absolute value omega filtering) and low-pass filtering) to be described hereinafter. In the preceding first embodiment, the filtering process is performed in the Fourier space. In the second embodiment, the filtering process is performed in the real space. The filtering process performed in the real space in the second embodiment is what is called convolution.

Next, the group of projection data filtered in the real space is back-projected (i.e. filtered back projection) to generate three-dimensional volume data. In this way, an image reconstruction is carried out to generate three-dimensional volume data of the region of interest without changing the processing space from the real space. The operator may observe an image of any sectional plane selected from the three-dimensional volume data. The above procedure of back-projecting the group of projection data after performing the predetermined filtering process in the real space is called a 2-D (two-dimensional) filtering method.

The image processor 51 includes a 2-D filtering unit 57 for performing the predetermined filtering process (i.e. |ω| filtering and low-pass filtering) in the real space on the group of projection data of the region of interest of patient M acquired by the circular scanning.

The 2-D filtering unit 57 includes a real space |ω| filtering unit for applying an |ω| filtering in the horizontal direction (U-direction) on the detecting plane of flat panel X-ray detector D, i.e. in the horizontal direction (U-direction) of the projection data obtained in the varied scan positions, and a real space low-pass filtering unit for applying a low-pass filtering in the vertical direction (V-direction) on the detecting plane of flat panel X-ray detector D, i.e. in the vertical direction (V-direction) of the projection data obtained in the varied scan positions. The V-direction corresponds to a projection line on the detecting plane of flat panel X-ray detector D to which the sectional axis (Z-axis) is projected.

The |ω| filtering by the real space |ω| filtering unit has functional characteristics corresponding to a back Fourier transform of Mr (ωr)·Mω (ωR) in the first embodiment, shown in FIGS. 12B and 12C and equations (7)–(10).

The low-pass filtering by the real space low-pass filtering unit has functional characteristics corresponding to a back Fourier transform of Mdepth (ωZ) in the first embodiment, shown in FIG. 12A and equation (6).

Figure 20:
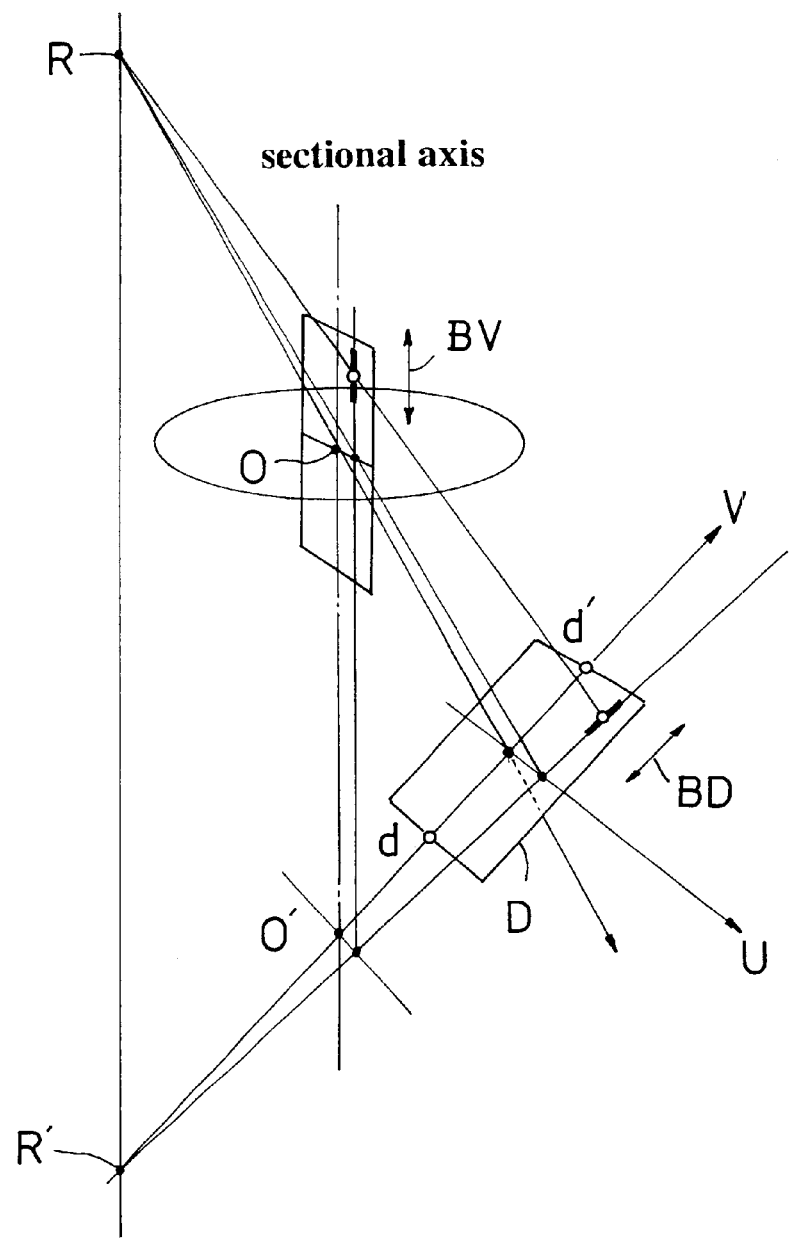
FIG. 20 is a schematic view illustrating a diffusion length and direction of filtering.
Figure 21A:
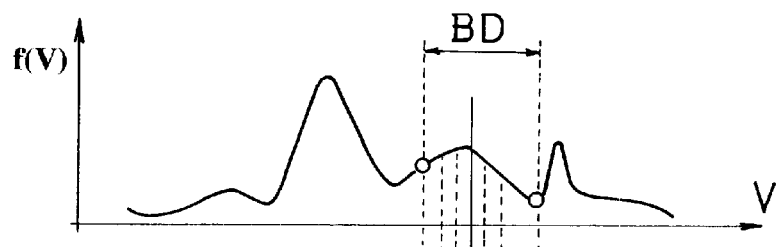
FIGS. 21A–C are schematic views illustrating a diffusion on the area detector.
Figure 21B:
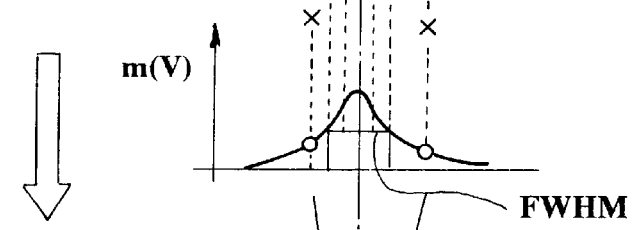
Figure 21C:
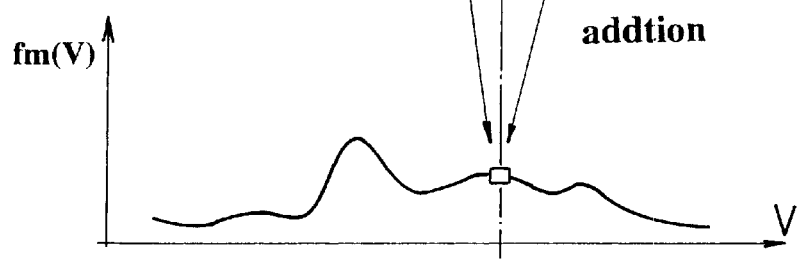

As shown in FIG. 20, the real space low-pass filtering unit regards, as diffusion length BV in the direction along the sectional axis, lattice spacing in the direction along the sectional axis (Z-axis) of a three-dimensional lattice eight times as large as lattice spacing in the two other directions (i.e. X- and Y-directions), and applies a low-pass filtering to a predetermined number of pixels (also called "diffusion length BD on the area detector") corresponding to the diffusion length BV along the sectional axis, of the projection data detected in the varied scan positions, thereby to determine pixel values of the predetermined number of pixels (diffusion length BD on the area detector). The lattice spacing in the direction along the sectional axis (Z-axis) is made eight times as large as the lattice spacing in the two other directions (i.e. X- and Y-directions), by diffusing four-fold the lattice spacing in the direction along the sectional axis (Z-axis) twice (ΔVZ/ ΔVY=2) as large as the lattice spacing in the two other directions (X- and Y-directions) shown in the first embodiment, thereby to make it eightfold, i.e. eight times the detecting pixel length in the X- and Y-directions. Specifically, the pixel values are derived as follows. For example, a distribution of pixel values in the vertical direction (V-direction) on the detecting plane of flat panel X-ray detector D forms an initial image f(V) as shown in FIG. 21A. A low-pass filter is applied, that is, a convolution operation is carried out, with a half value width FWHM of Gauss type low-pass filter function m(V) shown in FIG. 21B placed on a predetermined number of pixels corresponding to a certain diffusion length BV along the sectional axis (a diffusion length BD corresponding to four pixels on the area detector). Then, a pixel value is obtained by addition as shown in FIG. 21C. Similar convolution operations are carried out for predetermined pixels corresponding to remaining diffusion lengths BV along the sectional axis (diffusion lengths BD on the area detector). These operations produce a low-pass filtered image fm(V) diffused in the V-direction as shown in FIG. 21C.

The above filtering process in the real space is expressed as convolution (*) as in the following equation (12):

$$fm(V)=f(V)*m(V) \tag{12}$$

Figure 22:
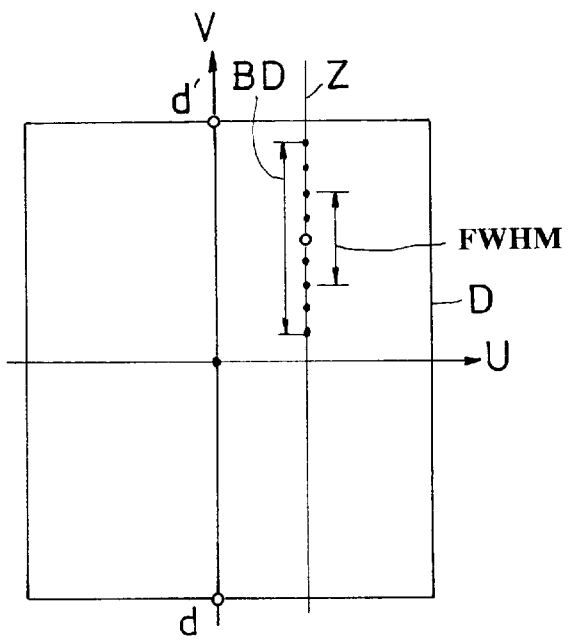
FIG. 22 is an explanatory view of a parallel beam approximation.

Where, as shown in FIG. 22, the direction of low-pass filtering (Z-direction) is parallel to a pixel array in the vertical direction (d–d' direction) on the detecting plane of flat panel X-ray detector D (collimated beam approximation), diffusion length BV along the sectional axis (Z-axis) of the three-dimensional lattice is projected to coincide with the pixel array in the vertical direction (d–d' direction) on the flat panel X-ray detector D. Thus, the low-pass filter may be applied to a predetermined number of pixels of flat panel X-ray detector D (diffusion length BD on the area detector) corresponding to the diffusion length BV along the sectional axis. In FIG. 22, spacing between adjacent black spots and white circle on the diffusion length BD on the area detector shown in FIG. 22 corresponds to each pixel on the flat panel X-ray detector D, and FWHM is the half value width of the Gauss type low-pass filter.

Figure 23:
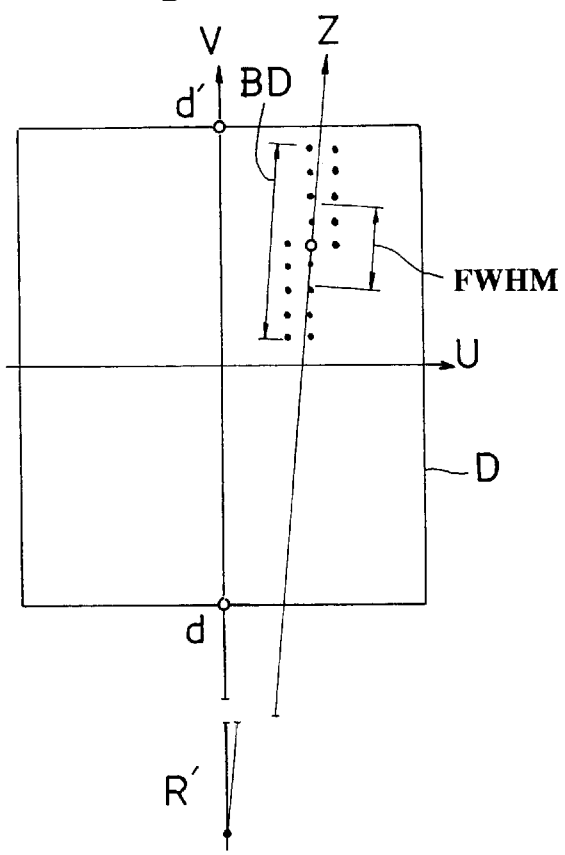
FIG. 23 is an explanatory view of an exact interpolation process.

However, where, as shown in FIG. 23, the direction of low-pass filtering (Z-direction) is not parallel to a pixel array in the vertical direction (d–d' direction) on the detecting plane of flat panel X-ray detector D, diffusion length BV along the sectional axis (Z-axis) of the three-dimensional lattice is projected as inclined relative to, rather than coinciding with, the pixel array in the vertical direction (d–d' direction) on the flat panel X-ray detector D. Thus, a predetermined number of pixels of flat panel X-ray detector D (diffusion length BD on the area detector) corresponding to the diffusion length BV along the sectional axis is computed by exactly interpolating a predetermined number of pixels in the d–d' direction adjacent the diffusion length BD on the area detector. Then, the low-pass filter may be applied after determining each pixel value in the direction of low-pass filtering (Z-direction) inclined relative to the d–d' direction.

A supplementary description will be made for the above case of collimated beam approximation and the other case. Referring to FIG. 20, collimated beam approximation means that a distance between R and O is sufficiently longer than a distance between O and D to cause X-ray beams to impinge substantially parallel to one another on the flat panel X-ray detector D. The other case means that the distance between R and O is substantially the same as the distance between O and D, whereby X-ray beams impinge in conical form on the flat panel X-ray detector D.

As described above, the real space low-pass filtering unit applies a low-pass filter to the projection data acquired in varied scan positions to determine pixel values of a predetermined number of pixels on the detecting plane of flat panel X-ray detector D (diffusion length BD on the area detector) corresponding to the diffusion length BV along the sectional axis eight times as large as the lattice spacing along the two other axes of the three-dimensional lattice.

The image processor 51 includes a back projection unit 53 for performing an image reconstruction to generate three-dimensional volume data by projecting the pixel values (diffusion length BD on the area detector) determined by the real space low-pass filtering unit, back to the three-dimensional lattice points.

Operation of the apparatus in the second embodiment having the above construction will be described next. First, before picking up images of the region of interest of patient M, the operator inputs various settings from the input unit 10. These settings include a distance from the X-ray tube R to the flat panel X-ray detector D, radii of the circles (e.g. 50 to 100 cm) along which the X-ray tube R and flat panel X-ray detector D are to be revolved, the number of views to be acquired (100 to 500), or intervals at which images are to be picked up, while the X-ray tube R and flat panel X-ray detector D are revolved, and a lattice spacing along the Z-axis of the three-dimensional lattice which is, for example, twice as large as the lattice spacing along the X- and Y-axes.

As shown in FIG. 19, the X-ray tube R and flat panel X-ray detector D are revolved along the circular tracks to pick up images of the region of interest of patient M. This step acquires a group of projection data detected in varied scan positions of the region of interest of patient M.

Next, the 2-D filtering unit 57 performs the filtering process (i.e. |ω| filtering and low-pass filtering) on these projection data as noted hereinbefore.

The back projection unit 53 projects the group of filtered projection data back to the three-dimensional lattice (back projection) to generate three-dimensional volute data. In this way, an image reconstruction is carried out to generate three-dimensional volume data of the region of interest.

The image information storage 52 stores the three-dimensional volume data resulting from the back projection by the back projection unit 53 of the group of filtered projection data. Image information of each slice or section among the three-dimensional volume data stored in the image information storage 52 may be displayed on the monitor 60 in response to an instruction inputted by the operator. For example, the image information of a slice selected by the operator is read from the three-dimensional volume data, and displayed on the monitor 60.

In the second embodiment described above, the real space low-pass filtering unit applies a low-pass filter to a predetermined number of pixels (i.e. diffusion length BD on the area detector) corresponding to the diffusion length BV along the sectional axis set larger than the detection pixel length in the two other directions, thereby to determine pixel values for the diffusion length BD on the area detector. The back projection unit 53 performs an image reconstruction to generate three-dimensional volume data of the region of interest by projecting the pixel values determined by the real space low-pass filtering unit back to the three-dimensional lattice. Consequently, the second embodiment produces the same effects as the preceding first embodiment. That is, compared with a back projection to a conventional three-dimensional lattice having an equal lattice spacing along the three axes, the data back-projected may be reduced by an amount corresponding to the enlarged lattice spacing in the direction along the sectional axis of the three-dimensional lattice over the lattice spacing in the two other directions. The processing time relating to the image reconstruction may be shortened accordingly. The back projection may be done without wasting the image information in the direction along the sectional axis.

In the second embodiment described above, pixel values for the diffusion length BD on the area detector are determined by applying a low-pass filter to a predetermined number of pixels (i.e. diffusion length BD on the area detector) corresponding to the diffusion length BV along the sectional axis of projection data acquired in varied scan positions. Instead, pixel values for the diffusion length BD on the area detector may be determined as follows. The gate lines of the flat panel detector D may be arranged in a direction corresponding to the direction along the sectional axis (Z-axis). By simultaneously turning on the gates of the predetermined number of pixels (diffusion length BD on the area detector) corresponding to the diffusion length BV along the sectional axis, signals of the plurality of pixels for the predetermined number of pixels are read simultaneously, thereby obtaining a summed signal. In this way, pixel values for the diffusion length BD on the area detector may be determined. This is equivalent to the application of the low-pass filter noted above. Thus, data collection with the low-pass filter applied to the predetermined number of pixels (diffusion length BD on the area detector) may be achieved in the form of hardware by controlling the area detector to read the data of the predetermined number of pixels simultaneously.

This invention is not limited to the foregoing embodiments, but may be modified as follows:

(1) In the foregoing embodiments, the low-pass filter is applied over a range elongated by four times. This range may be elongated by more than four times.

Figure 24A:
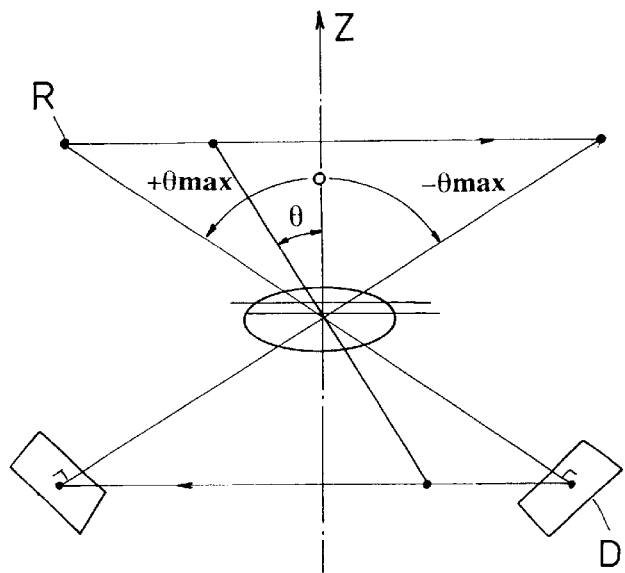
FIGS. 24A and 24B are views showing other image pickup modes of the X-ray radiographic apparatus.

(2) In the foregoing embodiments, the driver 30 causes the X-ray tube R and flat panel X-ray detector D to revolve along circular scanning tracks. Various other scan modes may be employed as described hereunder. As shown in FIG. 24A, for example, the X-ray tube R and flat panel X-ray detector D may be adapted movable linearly and parallel to each other with the patient M lying in between, with one of the X-ray tube R and flat panel X-ray detector D movable in a first direction, and the other movable in a second direction counter to the first direction. Thus, by causing the X-ray tube R and flat panel X-ray detector D to move linearly, parallel to each other, and scan the patient M lying in between, radiography may be carried out to enable an image reconstruction to generate three-dimensional volume data of a region of interest of patient M. In the case of this linear scanning, the inclination of filter function Mω (R) of the filtering unit 55 in the first embodiment may be varied for each projection image according to an angle (i.e. sectional angle θ described hereinafter) formed between the sectional axis Z and a straight line extending from the center of a cone beam emitted from the X-ray tube R to the center of the detecting plane of flat panel X-ray detector D.

Figure 24B:
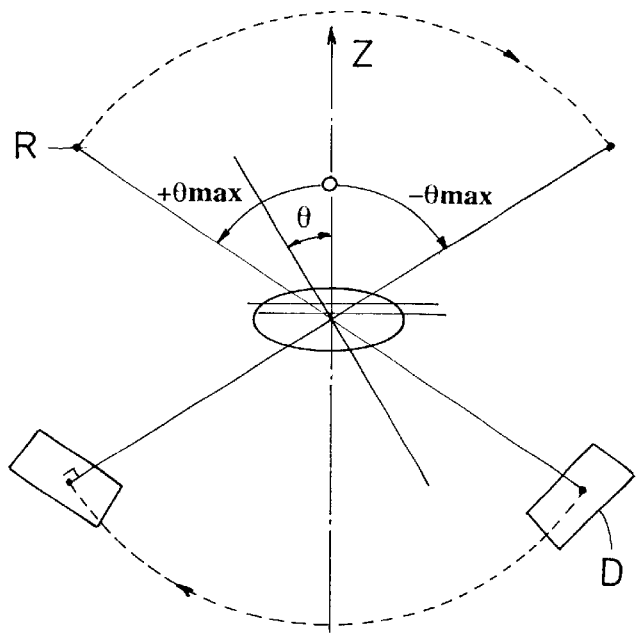

As shown in FIG. 24B, two arcuate tracks may be set on a circumferential track around the patient M to be opposed to each other across the patient M. The X-ray tube R is moved on one of the arcuate tracks, while the flat panel X-ray detector D is moved on the other arcuate track in synchronism therewith to maintain a fixed distance from the X-ray tube R, to perform what is known as arcuate scanning. Thus, by causing the X-ray tube R and flat panel X-ray detector D to move separately and arcuately and scan the patient M lying in between, radiography may be carried out to enable an image reconstruction to generate three-dimensional volume data of a region of interest of patient M. In the case of this arcuate scanning, the inclination of filter function Mω (R) of the filtering unit 55 in the first embodiment may be varied for each projection image according to an angle (i.e. sectional angle θ described hereinafter) formed between the sectional axis Z and a straight line extending from the center of a cone beam emitted from the X-ray tube R to the center of the detecting plane of flat panel X-ray detector D. As the angle θ changes during the scanning shown in FIGS. 24A and 24B, for example, the detection pixel length along the sectional axis may be defined by applying square mean value: θ to the θ shown in FIG. 8.

As shown in FIGS. 2 and 24, the X-ray tube R and flat panel X-ray detector D are opposed to each other, such that the center point of X rays emitted in a cone beam from the X-ray tube R constantly passes through the center point O of a particular sectional plane of patient M and impinges on the center point of and perpendicular to the detecting plane of flat panel X-ray detector D. The detecting plane of flat panel X-ray detector D may be maintained parallel to the sectional planes of patient M.

Though the X-ray tube R and flat panel X-ray detector D are moved in scanning action, the X-ray tube R may be fixed, with the flat panel X-ray detector D and patient M movable during the scanning, for example. Alternatively, the flat panel X-ray detector D may be fixed, with the X-ray tube R and patient M movable during the scanning. Thus, scanning may be performed by moving any two of the X-ray tube R, flat panel X-ray detector D and patient M.

(3) Before a convolution in the Feldkamp method, the lattice spacing along the sectional axis of a three-dimensional lattice may be made larger than the lattice spacing along the two other axes as in the foregoing embodiments.

(4) In the foregoing embodiments, the flat panel X-ray detector D is employed as the area detector. Various other two-dimensional area detectors may be employed, such as an image intensifier tube and an imaging plate.

(5) The radiographic apparatus in the foregoing embodiments are used for medical purposes in radiographing patient M. Such radiographic apparatus may be adapted for use in nondestructive testing, for example, of various electronic parts such as BGA (Ball Grid Array) substrates, printed circuit boards and so on.

(6) In the foregoing embodiments, the patient M is irradiated with X rays emitted from the X-ray tube R. Instead of X rays, other penetrating types of electromagnetic waves such as gamma rays and light may be used to produce similar effects. Thus, the radiographic apparatus according to this invention is not limited to X-ray radiographic apparatus. The invention is applicable also to radiographic apparatus for performing radiography by using the types of electromagnetic waves other than X rays that penetrate objects under examination.

This invention may be embodied in other specific forms without departing from the spirit or essential attributes thereof and, accordingly, reference should be made to the appended claims, rather than to the foregoing specification, as indicating the scope of the invention.

What is claimed is:

1. A radiographic apparatus for generating three-dimensional volume data of a region of interest of an object under examination by an image reconstruction of projection data acquired by radiographing the object from varied scan positions, and obtaining sectional images from the three-dimensional volume data, said apparatus comprising:

a radiation source for irradiating said object with penetrating electromagnetic waves;

an area detector for detecting electromagnetic waves transmitted through said object;

said radiation source and said area detector being arranged across sectional planes of the object and synchronously operable for scanning action; and a back projection unit for performing the image reconstruction to generate three-dimensional volume data of the region of interest by projecting projection data detected in the varied scan positions back to predetermined lattice points of a three-dimensional lattice virtually set to the region of interest of the object radiographed;

said back projection unit generating the three-dimensional volume data, with lattice spacing along a sectional axis extending substantially through the center of the region of interest and perpendicular to the sectional planes among three orthogonal axes of the three-dimensional lattice, made larger than lattice spacing in the two other directions.

2. A radiographic apparatus as defined in claim 1, wherein one of said radiation source and said area detector is linearly movable in a first direction, and the other is linearly movable in synchronism therewith in a second direction counter to said first direction.

3. A radiographic apparatus as defined in claim 1, wherein said radiation source is revolvable in one of parallel planes opposed to each other across the object, and said area detector is revolvable in synchronism therewith in the other parallel plane in a direction counter to a direction of revolution of said radiation source.

4. A radiographic apparatus as defined in claim 1, wherein two arcuate tracks are set on a circumferential track around the object to be opposed to each other across the object, said radiation source being movable along one of said arcuate tracks, and said area detector being movable in synchronism therewith along the other arcuate track to maintain a fixed distance from said radiation source.

5. A radiographic apparatus as defined in claim 1, wherein the lattice spacing along the sectional axis has a length set based on a detection pixel length along the sectional axis which is a length of one pixel of said area detector projected to the sectional axis.

6. A radiographic apparatus as defined in claim 1, further comprising a low-pass filtering unit for applying a low-pass filter in a direction along the sectional axis of the projection data detected in the varied scan positions.

7. A radiographic apparatus as defined in claim 2, wherein the lattice spacing along the sectional axis has a length set based on a detection pixel length along the sectional axis which is a length of one pixel of said area detector projected to the sectional axis.

8. A radiographic apparatus as defined in claim 3, wherein the lattice spacing along the sectional axis has a length set based on a detection pixel length along the sectional axis which is a length of one pixel of said area detector projected to the sectional axis.

9. A radiographic apparatus as defined in claim 4, wherein the lattice spacing along the sectional axis has a length set based on a detection pixel length along the sectional axis which is a length of one pixel of said area detector projected to the sectional axis.

10. A radiographic apparatus as defined in claim 5, further comprising a low-pass filtering unit for applying a low-pass filter in a direction along the sectional axis of the projection data detected in the varied scan positions.

11. A radiographic apparatus as defined in claim 7, further comprising a low-pass filtering unit for applying a low-pass filter in a direction along the sectional axis of the projection data detected in the varied scan positions.

12. A radiographic apparatus as defined in claim 8, further comprising a low-pass filtering unit for applying a low-pass filter in a direction along the sectional axis of the projection data detected in the varied scan positions.

13. A radiographic apparatus as defined in claim 9, further comprising a low-pass filtering unit for applying a low-pass filter in a direction along the sectional axis of the projection data detected in the varied scan positions.

14. A radiographic apparatus as defined in claim 6, wherein said low-pass filtering unit includes a three-dimensional Fourier transform unit for performing a three-dimensional Fourier transform of the three-dimensional volume data generated by said back projection unit, a Fourier space low-pass filtering unit for applying a low-pass filter along the sectional axis of the Fourier space data after the three-dimensional Fourier transform, and a three-dimensional back Fourier transform unit for performing a three-dimensional back Fourier transform of the Fourier space data after application of the low-pass filter and putting the Fourier space data back to three-dimensional volume data.

15. A radiographic apparatus as defined in claim 6, wherein said low-pass filtering unit applies a low-pass filter for diffusing at least four times a detection pixel length along the sectional axis.

16. A radiographic apparatus as defined in claim 6, wherein said area detector is a flat panel detector having gate lines arranged in a direction along the sectional axis, said low-pass filtering unit performing a low-pass filtering by simultaneously turning on gates on a predetermined number of pixel lines corresponding to the direction along sectional axis.

17. A radiographic apparatus as defined in claim 6, further comprising a real space low-pass filtering unit for applying a low-pass filter along the sectional axis corresponding to predetermined times a detection pixel length along the sectional axis, to predetermined numbers of pixels of said area detector corresponding to the sectional axis.

18. A radiographic apparatus as defined in claim 10, wherein said low-pass filtering unit includes a three-dimensional Fourier transform unit for performing a three-dimensional Fourier transform of the three-dimensional volume data generated by said back projection unit, a Fourier space low-pass filtering unit for applying a low-pass filter along the sectional axis of Fourier space data resulting from the three-dimensional Fourier transform, and a three-dimensional back Fourier transform unit for performing a three-dimensional back Fourier transform of the Fourier space data to which the low-pass filter has been applied, thereby putting the Fourier space data back to three-dimensional volume data.

19. A radiographic apparatus as defined in claim 14, wherein high frequency components along the sectional axis of the Fourier space data to which the low-pass filter has been applied are cut, thereby generating a reduced number of sectional images of subsequent three-dimensional volume data undergoing the three-dimensional back Fourier transform by said three-dimensional back Fourier transform unit.

20. A radiographic apparatus as defined in claim 17, wherein said back projection unit is arranged to project the projection data after the low-pass filtering back to the three-dimensional lattice, with the lattice spacing along the sectional axis of the three-dimensional lattice set between a detection pixel length along the sectional axis and a diffusion length along the sectional axis.

* * * * *